(12) United States Patent
Uranishi

(10) Patent No.: US 6,594,987 B2
(45) Date of Patent: Jul. 22, 2003

(54) APPARATUS FOR DETECTING FAULT IN EXHAUST SYSTEM OF INTERNAL COMBUSTION ENGINE

(75) Inventor: Koji Uranishi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/073,143

(22) Filed: Feb. 13, 2002

(65) Prior Publication Data
US 2002/0112467 A1 Aug. 22, 2002

(30) Foreign Application Priority Data
Feb. 16, 2001 (JP) ........................ 2001-040222
Jan. 18, 2002 (JP) ........................ 2002-010270

(51) Int. Cl.[7] .............................................. F01N 3/00
(52) U.S. Cl. ............................. 60/277; 60/276; 60/285; 123/90.15
(58) Field of Search .......................... 60/274, 276, 277, 60/285; 73/40, 47, 118.1; 123/90.15, 90.16, 90.17, 90.18, 676

(56) References Cited

U.S. PATENT DOCUMENTS

| | | | | |
|---|---|---|---|---|
| 5,134,850 A | * | 8/1992 | Saito et al. ............... | 123/90.16 |
| 5,351,526 A | * | 10/1994 | Krohm et al. ................ | 73/40 |
| 5,385,134 A | | 1/1995 | Krohm et al. ............... | 123/676 |
| 5,531,100 A | * | 7/1996 | Mezger et al. ................. | 73/47 |
| 5,537,817 A | * | 7/1996 | Akazaki et al. ............... | 60/285 |
| 5,617,722 A | | 4/1997 | Takaku ........................ | 60/277 |
| 6,055,948 A | * | 5/2000 | Shiraishi et al. .......... | 123/90.15 |

FOREIGN PATENT DOCUMENTS

| | | |
|---|---|---|
| JP | A 6-221144 | 8/1994 |
| JP | A 8-177605 | 7/1996 |
| JP | A 8-210126 | 8/1996 |

* cited by examiner

Primary Examiner—Thomas Denion
Assistant Examiner—Tu M. Nguyen
(74) Attorney, Agent, or Firm—Oliff & Berridge, PLC

(57) ABSTRACT

An apparatus for reliably and quickly detecting a fault in an exhaust system of an internal combustion engine, based on an output of an air/fuel ratio sensor mounted in the exhaust system. The apparatus includes: a control unit which provides a rich air/fuel ratio forcefully and continuously when detecting the presence or absence of a fault in the exhaust system; and a determining unit which determines that there is a fault in the exhaust system when the sensor mounted in the exhaust system does not produce an output that corresponds to the rich air/fuel ratio being provided under control of the control unit. The detection accuracy of the apparatus is enhanced by making provisions to perform the exhaust system fault detection when the engine is in an idling state in which the fluctuation in pressure is large and the effect of exhaust pipe leakage is most pronounced.

9 Claims, 19 Drawing Sheets

APPARATUS FOR DETECTING FAULT IN EXHAUST SYSTEM OF INTERNAL COMBUSTION ENGINE

BACKGROUND OF THE INVENTION

1. Field of the Invention

The present invention relates to an apparatus for detecting a fault, i.e., leakage, in an exhaust system of an internal combustion engine.

2. Description of the Related Art

Three-way catalysts for simultaneously promoting the oxidation of incompletely burned hydrocarbons (HC) and carbon monoxide (CO) and the reduction of nitrogen oxides (NOx) formed by residual oxygen reacting with nitrogen in the air are used on internal combustion automotive engines to control exhaust emissions. To enhance the oxidation/reduction performance of the three-way catalyst, the air/fuel ratio (A/F), which indicates engine combustion state, must be controlled to within a very narrow range (called the window) centered on stoichiometry. To achieve this, in fuel injection control of an engine, an $O_2$ sensor (oxygen sensor) for detecting whether the air/fuel ratio is richer or leaner than stoichiometry from the residual oxygen concentration in exhaust gas is mounted as an air/fuel ratio sensor, and feedback control of the air/fuel ratio is performed to correct the amount of fuel based on the sensor output.

In such an air/fuel ratio feedback control system, the $O_2$ sensor for detecting the oxygen concentration is mounted as close as possible to the combustion chamber, that is, on the upstream side of the catalytic converter. There is also implemented a double $O_2$ sensor system in which a second $O_2$ sensor is mounted on the downstream side of the catalytic converter in order to compensate for variations in the output characteristic of the upstream $O_2$ sensor. That is, on the downstream side of the catalytic converter, the exhaust gas is thoroughly stirred, and its oxygen concentration is almost in equilibrium by the action of the three-way catalyst; as a result, the output of the downstream $O_2$ sensor changes little compared with the upstream $O_2$ sensor, and thus indicates whether the air/fuel mixture as a whole is on the rich side or lean side. In the double $O_2$ sensor system, sub air/fuel ratio feedback control is performed using the $O_2$ sensor mounted downstream of the catalyst in addition to the main air/fuel ratio feedback control performed using the $O_2$ sensor mounted upstream of the catalyst, and various constants used when calculating the air/fuel ratio correction coefficient in the main air/fuel ratio feedback control are corrected based on the output of the downstream $O_2$ sensor, or a second air/fuel ratio correction coefficient based on the output of the downstream $O_2$ sensor is introduced, thereby accommodating variations in the output characteristic of the upstream $O_2$ sensor and improving the accuracy of the air/fuel ratio control.

In such a double $O_2$ sensor system, if a fault such as an exhaust pipe crack occurs between the $O_2$ sensor upstream of the catalyst and the $O_2$ sensor downstream of the catalyst, outside air may be drawn into the exhaust pipe by exhaust pulsation, causing the downstream $O_2$ sensor to erroneously detect that the exhaust air/fuel ratio is lean. If this happens, the engine air/fuel ratio is erroneously controlled toward the richer side, and the purification performance of the catalyst degrades, resulting in increased HC and CO emissions. There are also cases where the $O_2$ sensor downstream of the catalyst is used to detect deterioration of the catalyst; in such cases, the above exhaust system fault can cause erroneous detection.

In view of this, Japanese Unexamined Patent Publication No. 8-210126 discloses a technique in which, when the main air/fuel ratio feedback control constant corrected based on the downstream $O_2$ sensor output reaches a predetermined guard value, the catalyst deterioration determining process is inhibited by determining the situation as being an exhaust system fault (exhaust pipe leakage).

This prior art technique attempts to detect an exhaust system fault from a tendency to lean that the output of the downstream $O_2$ sensor is showing, but the main air/fuel ratio feedback control constant corrected based on the downstream $O_2$ sensor output is not a parameter that always corresponds one for one to an exhaust system fault, because the constant is also affected by other factors such as the deteriorating tendency of the catalyst. Therefore, with the above prior art, it is difficult to detect an exhaust system fault reliably and quickly.

Recent years have also seen the development of an internal combustion engine in which air/fuel ratio is controlled so that the three-way catalyst can always provide a constant and stable purification performance. That is, the three-way catalyst has an $O_2$ storage capability and purifies the exhaust gas by adsorbing excessive oxygen when the exhaust gas is lean and by releasing necessary oxygen when the exhaust gas is rich, but such a capability is limited. To make effective use of the $O_2$ storage capability, therefore, it is important that the amount of oxygen stored in the catalyst be maintained at a prescribed level (for example, one-half the maximum oxygen storage amount) so as to be able to respond to the next change in the air/fuel ratio of the exhaust gas, whether it is a change to a rich state or a lean state. When the amount of oxygen is maintained in this manner, a consistent $O_2$ adsorption/desorption function can be achieved, ensuring a consistent oxidation/reduction performance of the catalyst.

In the internal combustion engine in which the $O_2$ storage amount is controlled to a constant level to maintain the purification performance of the catalyst as described above, a wide-range air/fuel ratio sensor capable of linearly detecting air/fuel ratio is used, for example, and feedback control (F/B control) is performed based on proportional-integral operations (PI operations). In such an $O_2$ storage amount constant control system, an $O_2$ sensor may also be installed on the downstream side of the catalyst in order to compensate for variations in the output characteristic of the wide-range air/fuel ratio sensor. In this case also, there arise the same problems as those described for the double $O_2$ sensor system.

It should also be recognized that the problem that, in the event of an automotive exhaust pipe fault, exhaust gases not purified by the catalyst are discharged into the atmosphere, or outside air is drawn into the exhaust pipe by exhaust pulsation, can also occur in an internal combustion engine equipped with only one air/fuel ratio sensor in the exhaust system.

SUMMARY OF THE INVENTION

The present invention has been devised in view of the above-outlined problems, and an object of the invention is to provide an apparatus that can reliably and quickly detect a fault in an exhaust system of an internal combustion engine.

To attain the above object, according to a first aspect of the present invention, there is provided an apparatus for detecting a fault in an exhaust system of an internal combustion engine, comprising: control means for providing a rich air/fuel ratio forcefully and continuously when detecting the presence or absence of a fault in the exhaust system; and determining means for determining that there is a fault in the exhaust system when a sensor mounted in the exhaust system does not produce an output that corresponds to the rich air/fuel ratio being provided under control of the control means. Since an exhaust system fault (leakage) is detected by forcefully enriching the air/fuel ratio, the apparatus of this invention can improve detection accuracy compared with an apparatus of the type that detects exhaust leakage during air/fuel ratio feedback control.

According to a second aspect of the present invention, there is provided an apparatus for detecting a fault in an exhaust system of an internal combustion engine, comprising: control means for providing a rich air/fuel ratio forcefully and continuously during engine idling when detecting the presence or absence of a fault in the exhaust system; and determining means for determining that there is a fault in the exhaust system when a sensor mounted in the exhaust system does not produce an output that corresponds to the rich air/fuel ratio being provided under control of the control means. As an exhaust system fault (leakage) is detected by forcefully enriching the air/fuel ratio when the engine is in an idling state in which exhaust pulsation is large, the apparatus of this invention achieves further enhanced detection accuracy.

According to a third aspect of the present invention, there is provided an apparatus for detecting a fault in an exhaust system of an internal combustion engine in which air/fuel ratio is feedback-controlled based on outputs of an upstream and a downstream air/fuel ratio sensor respectively mounted on the upstream and downstream sides of a catalytic converter installed in the exhaust system, comprising: enriching control means for stopping the feedback control and performing control to continuously maintain the air/fuel ratio of the engine in a rich condition; and fault determining means for determining that there is a fault in the exhaust system when the downstream air/fuel ratio sensor does not produce an output that corresponds to the rich air/fuel ratio being provided under control of the enriching control means.

According to a fourth aspect of the present invention, in the apparatus of the third aspect, preferably, the enriching control means performs the enriching control when the engine is in an idling state.

According to a fifth aspect of the present invention, in the apparatus of the third aspect, preferably, both the upstream air/fuel ratio sensor and the downstream air/fuel ratio sensor are $O_2$ sensors for detecting whether the air/fuel ratio in exhaust gas is rich or lean, and the fault determining means determines the presence or absence of a fault in the exhaust system by comparing the outputs of the two sensors.

According to a sixth aspect of the present invention, in the apparatus of the third aspect, preferably the upstream air/fuel ratio sensor is a wide-range air/fuel ratio sensor whose output characteristic is substantially proportional to the air/fuel ratio in the exhaust gas, while the downstream air/fuel ratio sensor is an $O_2$ sensor for detecting whether the air/fuel ratio in the exhaust gas is rich or lean, and the fault determining means determines that there is a fault in the exhaust system when the output of the downstream $O_2$ sensor shows a value corresponding to a lean condition.

According to a seventh aspect of the present invention, there is provided an apparatus for detecting a fault in an exhaust system of an internal combustion engine equipped with means for stopping engine idling, comprising: control means for disabling the idling stop when a condition for detecting the presence or absence of a fault in the exhaust system occurs, and for operating the engine in an idling state with a rich air/fuel ratio; and determining means for determining that there is a fault in the exhaust system when a sensor mounted in the exhaust system does not produce an output that corresponds to the rich air/fuel ratio being provided under control of the control means. As earlier noted, it is preferable to detect an exhaust system fault (leakage) when the engine is in an idling state in which exhaust pulsation is large, but in a vehicle equipped with an idling stop function for energy conservation purposes, there is no idling region in the first place. In the apparatus of the seventh aspect, when detecting the presence or absence of a fault in the exhaust system, the engine is forcefully operated in an idling state so that the detection can be made.

According to an eighth aspect of the present invention, there is provided an apparatus for detecting a fault in an exhaust system of an internal combustion engine of a vehicle that uses the internal combustion engine and an electric motor as power sources, comprising: control means for operating the internal combustion engine with a rich air/fuel ratio when detecting the presence or absence of a fault in the exhaust system, by changing an operating ratio between the internal combustion engine and the electric motor so that the internal combustion engine operates within a designated operating range; and determining means for determining that there is a fault in the exhaust system when a sensor mounted in the exhaust system does not produce an output that corresponds to the rich air/fuel ratio being provided under control of the control means. In the case of a hybrid vehicle system, when detecting the presence or absence of a fault in the exhaust system by forcefully enriching the air/fuel ratio, the internal combustion engine is operated so that the exhaust pulsation becomes large, and the variations in the torque of the internal combustion engine are canceled out by the electric motor. This serves to improve the accuracy of detection of an exhaust system fault.

According to a ninth aspect of the present invention, when detecting the presence or absence of a fault in an exhaust system of an internal combustion engine equipped with a variable valve timing mechanism, the variable valve timing mechanism is controlled so that a negative pressure wave in the exhaust system becomes large. In the case of an engine equipped with a variable valve timing mechanism, the accuracy of detection of an exhaust system fault (leakage) can be enhanced by controlling the variable valve timing mechanism so that the negative pressure wave in the exhaust passage becomes large. Generally, when control is performed in such a direction as to increase the overlap period of the intake and exhaust valves, the negative pressure wave in the exhaust passage becomes large.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Embodiments of the present invention will be described below with reference to the accompanying drawings.

Figure 1:
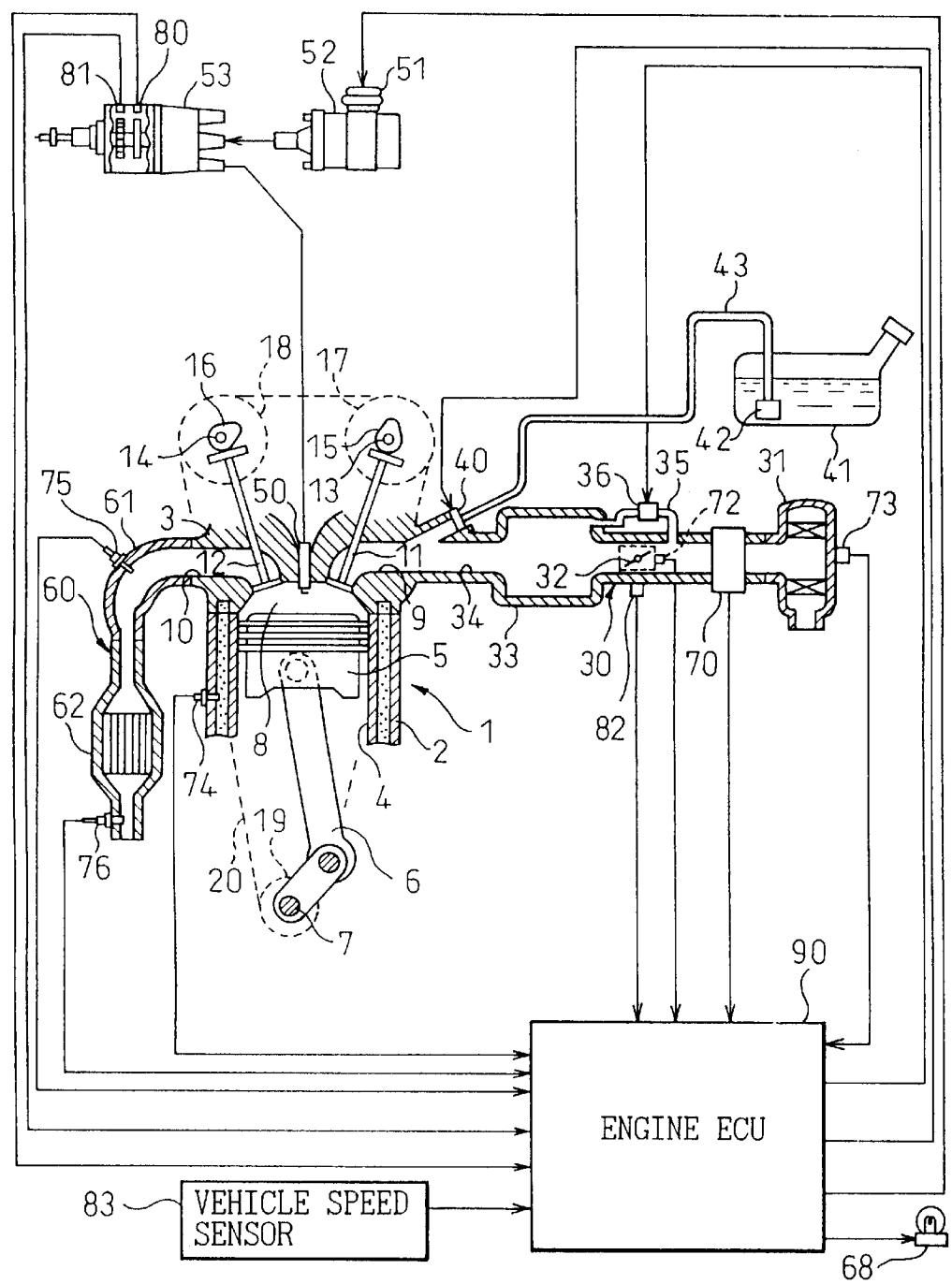
FIG. 1 is a schematic diagram showing the general configuration of an electronically controlled internal combustion engine equipped with an exhaust system fault detection apparatus according to one embodiment of the present invention.

FIG. 1 is a schematic diagram showing the general configuration of an internal combustion engine equipped with an exhaust system fault detection apparatus according to one embodiment of the present invention. The internal combustion engine 1 is an in-line multi-cylinder, four-stroke/cycle reciprocating gasoline engine mounted in a vehicle. The engine 1 comprises a cylinder block 2 and a cylinder head 3. In the cylinder block 2 are bored a plurality of vertically extending cylinders 4 arranged side by side in the direction perpendicular to the plane of the figure, and a piston 5 is mounted movably in reciprocating fashion inside each cylinder 4. Each piston 5 is connected to a common crankshaft 7 by means of a connecting rod 6. The reciprocating motion of the piston 5 is converted to the rotational motion of the crankshaft 7 by means of the connecting rod 6.

Between the cylinder block 2 and the cylinder head 3 are formed combustion chambers 8 one each located above each piston 5. The cylinder head 3 contains an intake port 9 and an exhaust port 10 for each combustion chamber 8 which communicates with both exterior faces thereof through these ports. To open and close the ports 9 and 10, an intake valve 11 and an exhaust valve 12 are supported in the cylinder head 3 in such a manner as to be movable, in a reciprocating fashion, in substantially vertical directions. In the cylinder head 3, an intake camshaft 13 and an exhaust camshaft 14 are rotatably mounted above the respective valves 11 and 12. The camshafts 13 and 14 are fitted with cams 15 and 16 for driving the intake valve 11 and exhaust valve 12, respectively. Timing pulleys 17 and 18 mounted on respective ends of the camshafts 13 and 14 are connected by means of a timing belt 20 to a timing pulley 19 mounted on one end of the crankshaft 7.

An intake passage 30, provided with an air cleaner 31, throttle valve 32, surge tank 33, intake manifold 34, etc., is connected to the intake port 9. Air (fresh air) drawn from outside the engine 1 passes through the parts 31, 32, 33, and 34 of the intake passage 30 in this order and flows toward the combustion chamber 8. An idle speed control valve (ISCV) 36 for adjusting the air flow rate during idle is installed in an idle adjust passage 35 that bypasses the throttle valve 32. An injector 40 for injecting fuel toward the intake port 9 is mounted in the intake manifold 34. Fuel, which is stored in a fuel tank 41, is drawn by a fuel pump 42 and supplied to the injector 40 through a fuel pipe 43. The fuel injected from the injector 40 is mixed with the air flowing through the intake passage 30, and the air/fuel mixture is introduced into the combustion chamber 8 through the intake valve 11.

A spark plug 50 is mounted in the cylinder head 3 to ignite the mixture. To accomplish the ignition, an ignition signal is applied to an igniter 51, which controls the switching of the primary current in an ignition coil 52, and the induced secondary current is supplied to the spark plug 50 by an ignition distributor 53.

The burned mixture as exhaust gas is introduced through the exhaust valve 12 into the exhaust port 10. An exhaust passage 60 provided with an exhaust manifold 61, catalytic converter 62, etc. is connected to the exhaust port 10. The catalytic converter 62 contains a three-way catalyst which simultaneously promotes the oxidation of incompletely burned hydrocarbons (HC) and carbon monoxide (CO) and the reduction of nitrogen oxides (NOx) formed by residual oxygen reacting with nitrogen in the air. The exhaust gas thus purified by the catalytic converter 62 is then discharged into the atmosphere.

Figure 2:
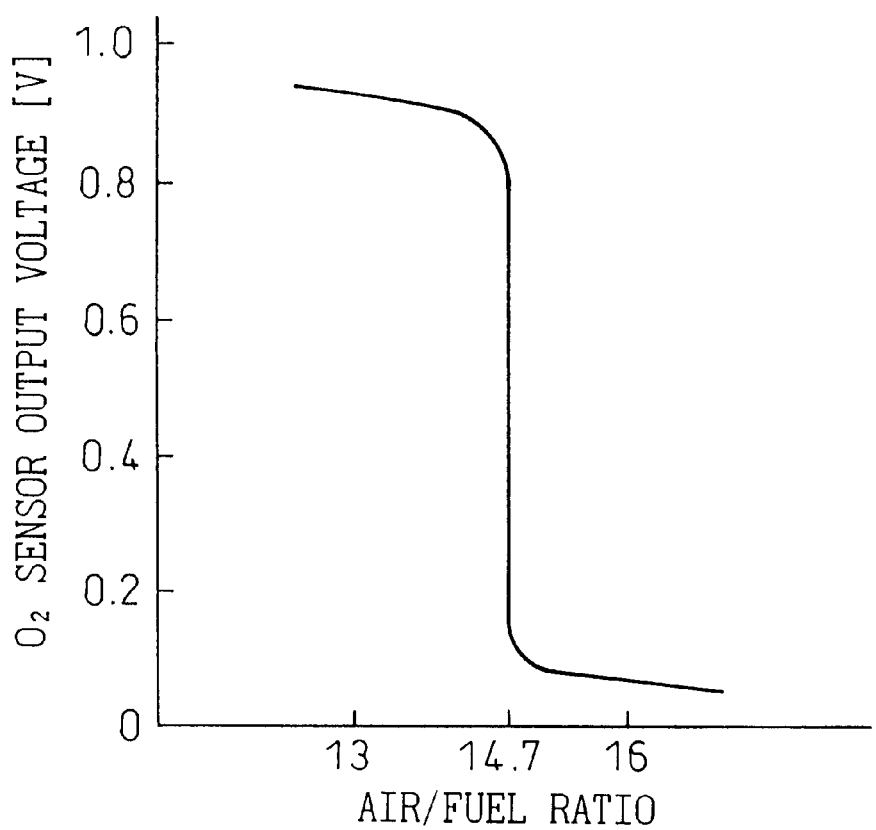
FIG. 2 is a characteristic diagram showing the output voltage of an $O_2$ sensor as a function of air/fuel ratio.

The engine 1 is equipped with various kinds of sensors. A coolant temperature sensor 74 for detecting the coolant temperature of the engine 1 is mounted in the cylinder block 2. An air flow meter 70 for detecting the amount of intake air (mass flow rate) is mounted in the intake passage 30. In the intake passage 30, an intake air temperature sensor 73 for detecting intake air temperature is mounted near the air cleaner 31. Near the throttle valve 32 in the intake passage 30 is mounted a throttle angle sensor 72 for detecting the angular position of its shaft. When the throttle valve 32 reaches its fully closed position, an idle switch 82 is turned on and its output, a throttle full-close signal, is set active. An upstream $O_2$ sensor (main $O_2$ sensor) 75 for detecting whether the air/fuel ratio is leaner or richer than stoichiometry is mounted as an air/fuel ratio sensor on the upstream side of the catalytic converter 62 in the exhaust passage 60. In this engine, sub air/fuel ratio feedback control is performed to compensate for variations in the output characteristic of the upstream $O_2$ sensor 75; for this purpose, a downstream $O_2$ sensor (sub $O_2$ sensor) 76 is mounted in the exhaust passage downstream of the catalytic converter 62. A typical output characteristic of the $O_2$ sensor is shown in FIG. 2.

The distributor 53 contains two rotors which rotate in synchronism with the rotation of the crankshaft 7. The distributor 53 is provided with a crankshaft reference position sensor 80 which, based on the rotation of one rotor, generates a reference position detection pulse for every 720° CA rotation, measured in degrees of crankshaft angle (CA), for detection of the reference position of the crankshaft 7, and a crank angle sensor 81 which, based on the rotation of the other rotor, generates a rotational speed detection pulse for every 30° CA for detection of the rotational speed of the crankshaft 7 (engine speed NE). The vehicle is also mounted with a vehicle speed sensor 83 which produces output pulses the number of which, in a unit of time, is proportional to the rotational speed of the transmission output shaft, i.e., the vehicle speed SPD.

Figure 3:
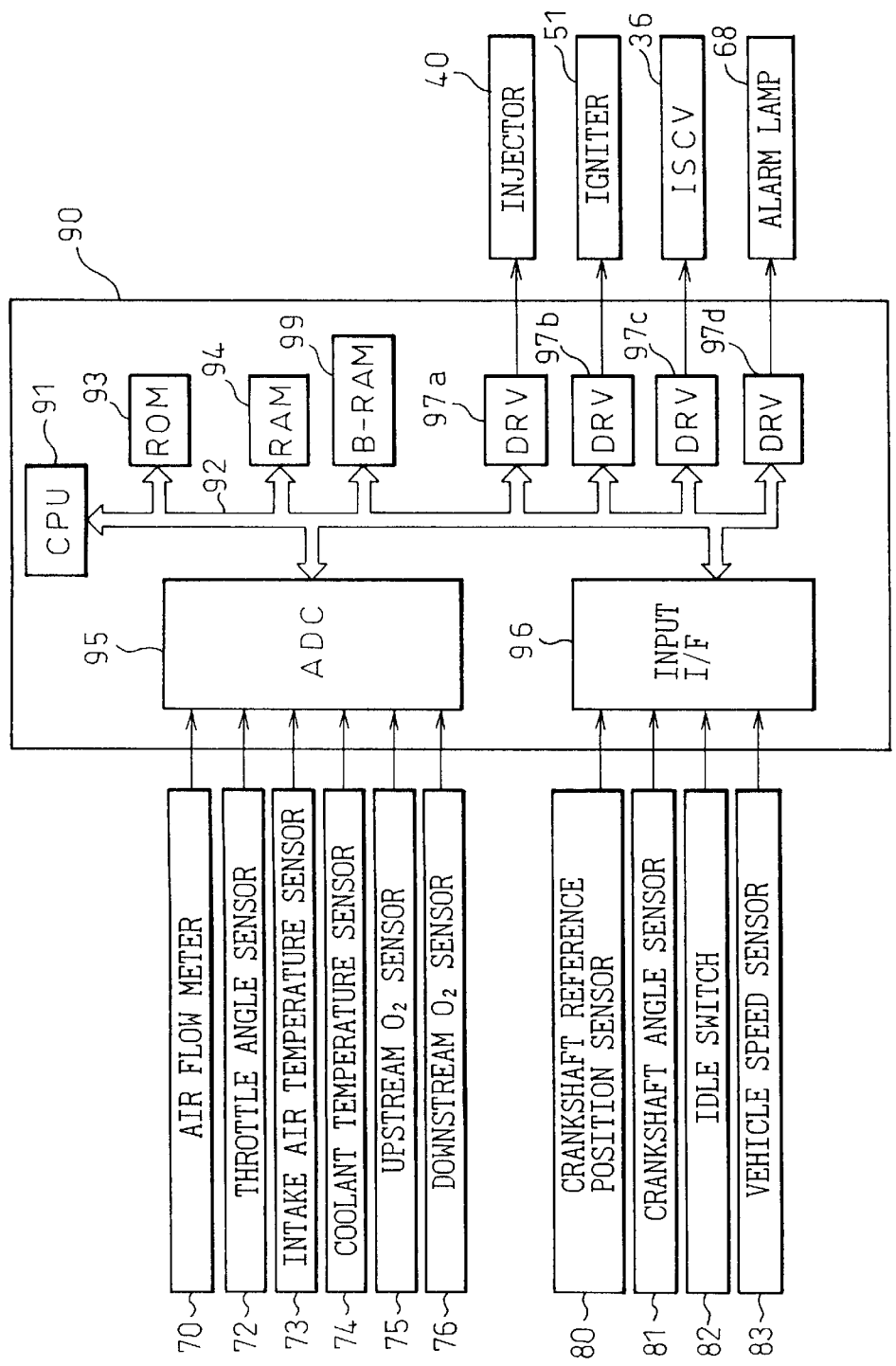
FIG. 3 is a block diagram showing the hardware configuration of an engine electronic control unit (engine ECU)

An engine electronic control unit (engine ECU) 90 is a microcomputer system that performs processing for exhaust system fault detection according to the present invention, in addition to air/fuel ratio control (fuel injection control), ignition timing control, idle speed control, etc. The hardware configuration is shown in the block diagram of FIG. 3. Signals from the various sensors and switches are input via an A/D conversion circuit (ADC) 95 or via an input interface circuit 96 to a central processing unit (CPU) 91; using the input signals, the CPU 91 performs arithmetic operations in accordance with programs and various maps stored in a read-only memory (ROM) 93 and, based on the results of the operations, outputs control signals for the various actuators via respective drive circuits 97a to 97d. A random-access memory (RAM) 94 is used to temporarily store data during the arithmetic operation and control processes. A backup RAM 99 is supplied with power from a battery (not shown) directly connected to it, and is used to store data (such as various learning values) that should be retained when the ignition switch is off. These constituent elements of the ECU are interconnected by a system bus 92 consisting of an address bus, a data bus, and a control bus.

In the ECU 90, an A/D conversion routine is carried out for every predetermined crank angle to read in an intake air amount signal, a throttle angle signal, an intake air temperature signal, and a coolant temperature signal for various control operations, and these signals are stored in designated areas in the RAM 94 as intake air amount data GA, throttle angle data TA, intake air temperature data THA, and coolant temperature data THW, respectively. Each time a pulse signal is input from the crank angle sensor 81, the engine speed is calculated from its pulse spacing by a routine not shown, and stored as engine speed data NE in a designated area in the RAM 94.

Ignition timing control is performed by sending an ignition signal to the igniter 51 via the drive circuit 97b after determining the optimum ignition timing by comprehensively judging the engine condition based on the engine speed obtained from the crank angle sensor 81 and on signals from other sensors. On the other hand, in idle speed control, an idle state is detected based on the throttle full-close signal from the idle switch 82 and the vehicle speed signal from the vehicle speed sensor 83, and the actual engine speed is compared with the target engine speed determined by such factors as the engine coolant temperature from the coolant temperature sensor 74; then, based on the resulting error, the amount of control necessary to achieve the target engine speed is determined, and the amount of air is adjusted by controlling the ISCV 36 via the drive circuit 97c, thereby maintaining optimum idle speed. Next, the air/fuel ratio control will be described.

Figure 4:
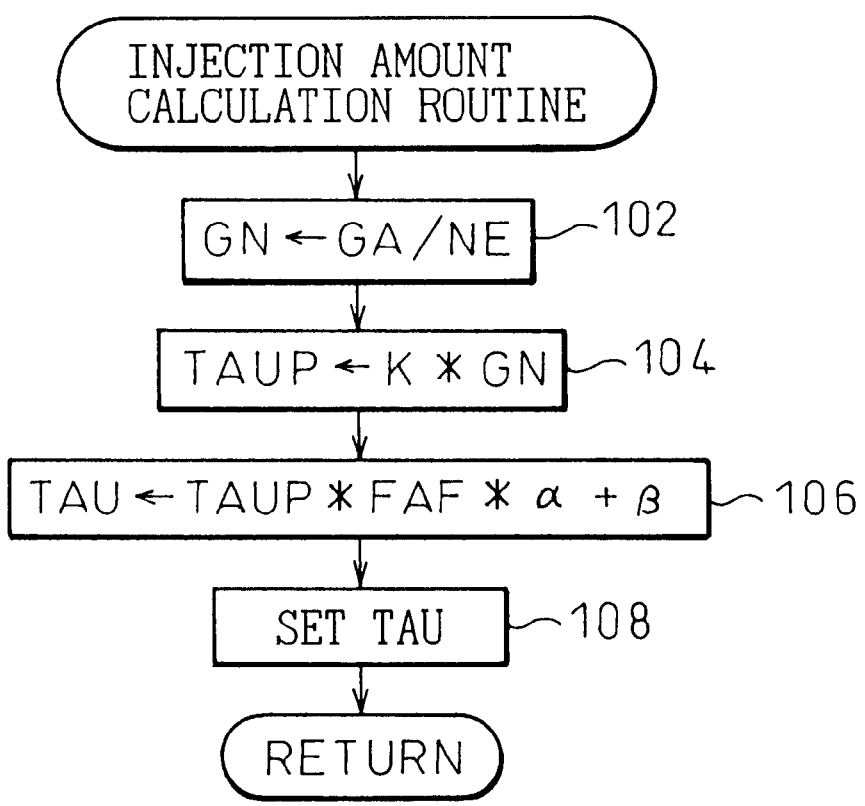
FIG. 4 is a flowchart illustrating the processing sequence for an injection amount calculation routine executed by a CPU.

FIG. 4 is a flowchart illustrating the processing sequence for an injection amount calculation routine executed by the CPU 91. This routine is carried out for every predetermined crank angle (for example, every 360°). In this routine, the amount of fuel injection, that is, fuel injection time TAU representing the time that fuel is injected by the injector 40, is calculated based on intake air amount GN per engine revolution and air/fuel ratio correction coefficient FAF described hereinafter.

More specifically, first, in step 102, the intake air amount data GA and the engine speed data NE are read out from the designated areas in the RAM 94, and the intake air amount GN per engine revolution is obtained by calculating $$GN \leftarrow GA/NE$$

Next, in step 104, basic fuel injection time TAUP is calculated as $$TAUP \leftarrow K*GN$$

Here, the basic fuel injection time TAUP is the fuel injection time necessary to achieve stoichiometric air/fuel ratio for the air/fuel mixture supplied to the combustion chamber, and K is a constant.

The actual fuel injection time TAU is calculated in step 106 by correcting TAUP by the air/fuel ratio correction coefficient FAF, that is $$TAU \leftarrow TAUP*FAF*\alpha+\beta$$

where $\alpha$ and $\beta$ are a correction coefficient and a correction amount, respectively, determined according to the engine operating condition. When the fuel injection time TAU is calculated as described above, then in step 108, the time TAU is loaded into the drive circuit 97a, and the amount of fuel proportional to the time TAU is injected from the injector 40.

In the fuel injection control, when the throttle valve 32 is in a fully closed position, and yet the engine speed is higher than a predetermined value, then it is determined that the vehicle is in a decelerating condition that does not need fuel delivery, and fuel cut is effected to temporarily stop fuel injection. On the other hand, fuel enrichment correction such as acceleration enrichment correction and output enrichment correction is also performed depending on the engine operating condition.

Control for obtaining the air/fuel ratio correction coefficient FAF is the air/fuel ratio feedback control; in the air/fuel ratio feedback control of the present embodiment, the air/fuel ratio is feedback-controlled based on the output of the upstream $O_2$ sensor 75, and at the same time, control is performed to correct for variations, etc. in the output characteristic of the upstream $O_2$ sensor 75, based on the output of the downstream $O_2$ sensor 76.

Figure 5:
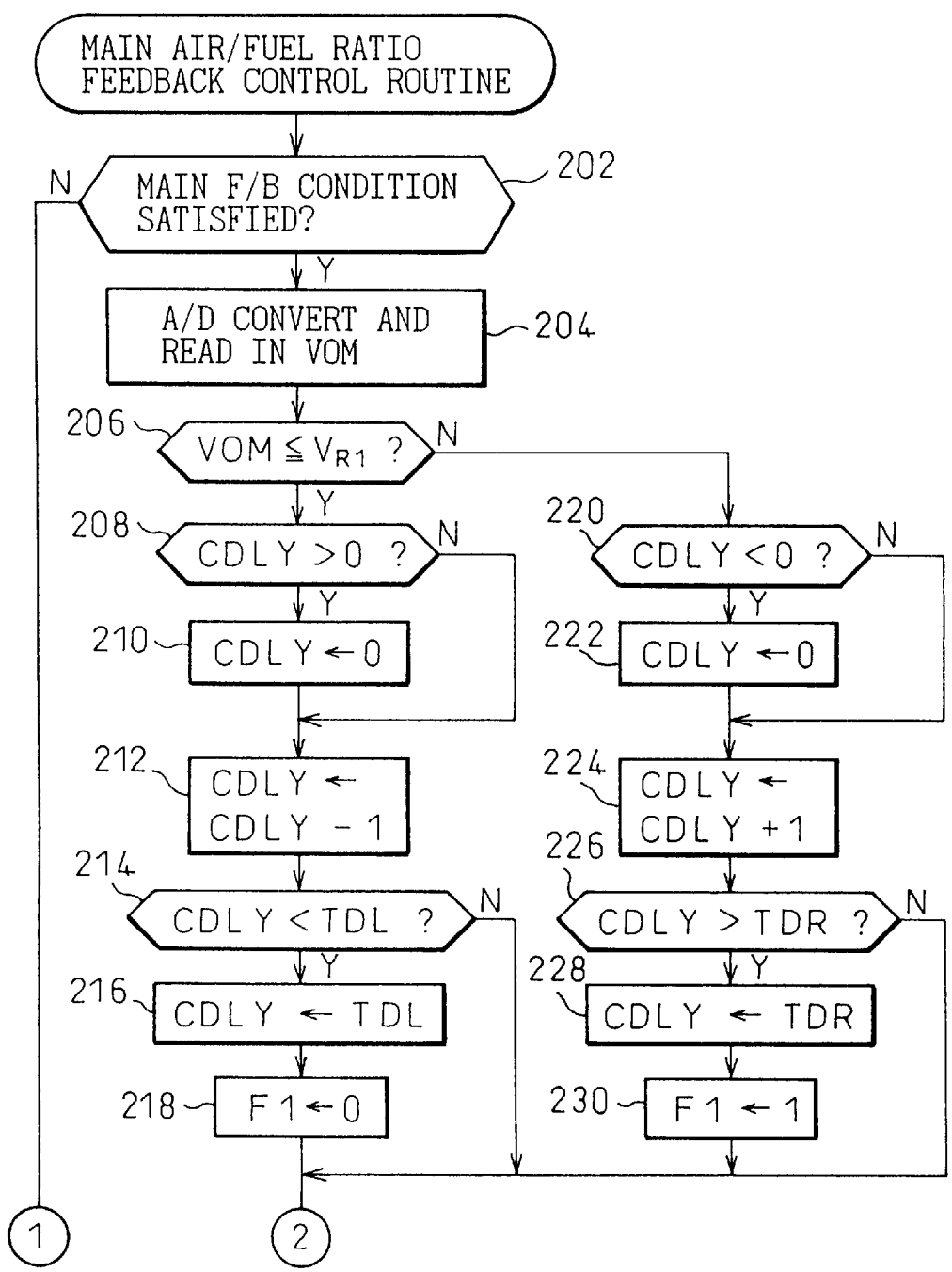
FIG. 5 is a flowchart (1/2) illustrating the processing sequence for a main air/fuel ratio feedback control routine executed by the CPU.
Figure 6:
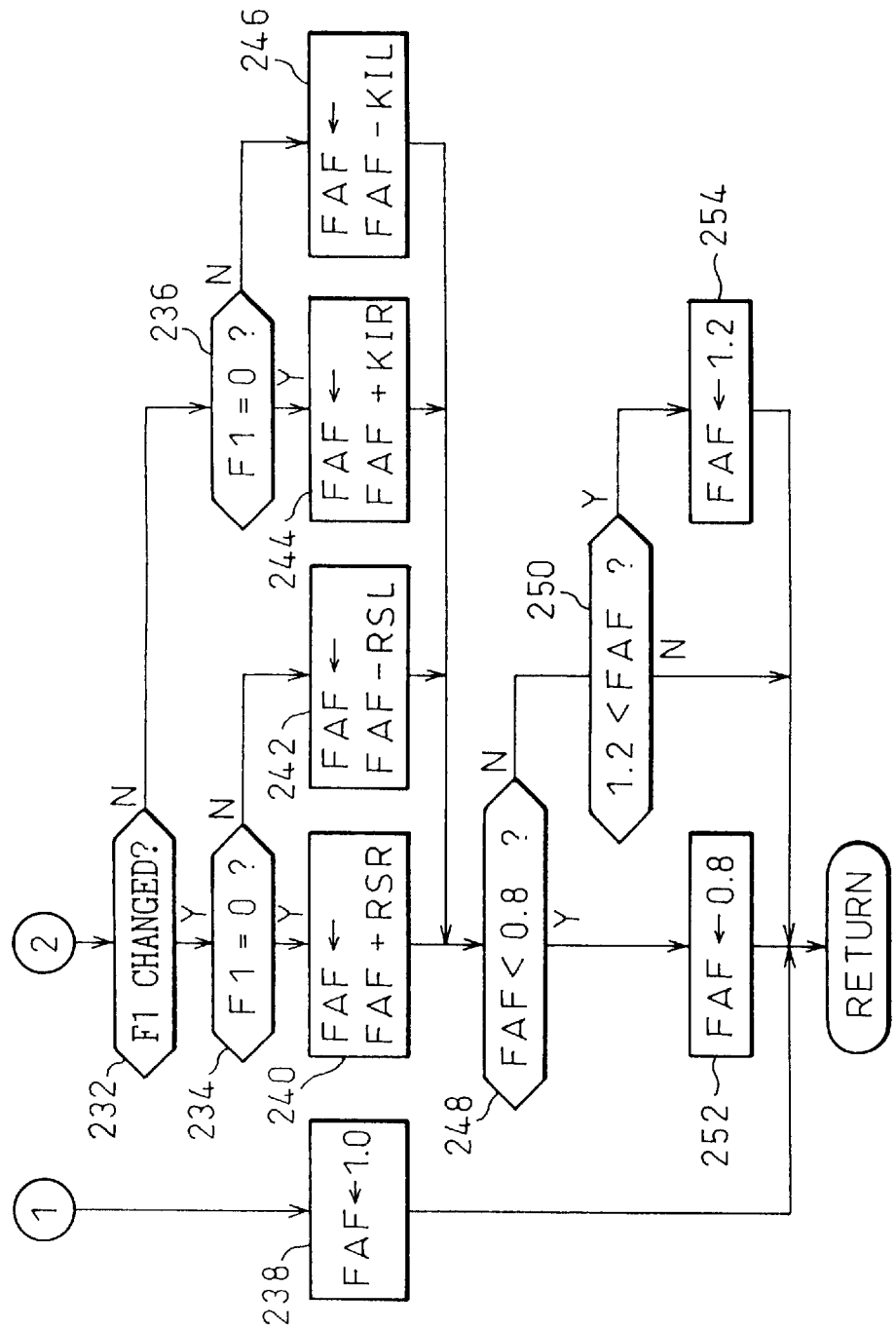
FIG. 6 is a flowchart (2/2) illustrating the processing sequence for the main air/fuel ratio feedback control routine executed by the CPU.

FIGS. 5 and 6 are a flowchart illustrating the processing sequence for the main air/fuel ratio feedback control performed based on the output of the upstream O₂ sensor 75. This routine is executed by the CPU 91 at predetermined intervals of time (for example, every 4 ms). In this routine, the output VOM of the upstream O₂ sensor 75 is compared with a reference voltage $V_{R1}$ (voltage equivalent to a stoichiometric air/fuel ratio), and control is performed to decrease the air/fuel ratio correction coefficient FAF when the exhaust air/fuel ratio on the upstream side of the catalytic converter is richer than stoichiometry (VOM>$V_{R1}$) and to increase the FAF when the air/fuel ratio is lean (VOM≦$V_{R1}$). The O₂ sensor outputs a voltage signal of, for example, 0.9 V when the exhaust air/fuel ratio is richer than stoichiometry, and a voltage signal of, for example, about 0.1 V when the exhaust air/fuel ratio is leaner than stoichiometry (see FIG. 2). In the present embodiment, the reference voltage $V_{R1}$ is set to about 0.45 V. By increasing or decreasing the air/fuel ratio correction coefficient FAF according to the exhaust air/fuel ratio as described above, the engine air/fuel ratio is precisely controlled at or near stoichiometry even when there is a small amount of error in the air flow meter 70, injector 40, or other devices in the fuel supply system.

More specifically, first, in step 202, it is determined whether a condition for initiating the main air/fuel ratio feedback control based on the upstream O₂ sensor is satisfied or not. It is determined that the condition for initiating the feedback control is not satisfied, for example, when the coolant temperature is below a predetermined value, the engine is being cranked, the amount of fuel is being increased after engine start or during engine warmup, the output is being increased, there is no inversion in the output signal of the upstream O₂ sensor 75, or the fuel is being cut off. In other cases, the feedback control initiating condition is satisfied. If the condition is not satisfied, the air/fuel ratio correction coefficient FAF is set to 1.0 in step 238, and the routine is terminated. On the other hand, if the condition is satisfied, the process proceeds to step 204.

In step 204, the output VOM of the upstream O₂ sensor 75 is A/D converted and read in. In the next step 206, VOM is compared with the reference voltage $V_{R1}$ (for example, 0.45 V) to determine whether the air/fuel ratio is lean or rich; if the air/fuel ratio is lean (VOM≦$V_{R1}$), the process proceeds to step 208. In step 208, it is determined whether delay counter CDLY shows a positive value or not, and if CDLY>0, the process proceeds to step 212 after setting CDLY to 0 in step 210; on the other hand, if CDLY≦0, the process proceeds directly to step 212. In step 212, the delay counter CDLY is decremented by 1. Next, in step 214, the delay counter CDLY is compared with a predetermined minimum value TDL, and if CDLY<TDL, the delay counter CDLY is maintained at the minimum value TDL in step 216, air/fuel ratio flag F1 is set to 0 (lean) in step 218, and the process proceeds to step 232; on the other hand, if CDLY≧TDL, the process proceeds directly to step 232. Here, the minimum value TDL is defined by a negative value, and provides a lean determination delay time during which the air/fuel ratio is determined to be rich even if the output of the upstream O₂ sensor 75 changes from rich to lean.

ON the other hand, when it is determined in step 206 that the air/fuel ratio is rich (VOM>$V_{R1}$), the process proceeds to step 220. In step 220, it is determined whether delay counter CDLY shows a negative value or not, and if CDLY<0, the process proceeds to step 224 after setting CDLY to 0 in step 222; on the other hand, if CDLY≧0, the process proceeds directly to step 224. In step 224, the delay counter CDLY is incremented by 1. Next, in step 226, the delay counter CDLY is compared with a predetermined maximum value TDR and, if CDLY>TDR, the delay counter CDLY is maintained at the maximum value TDR in step 228, the air/fuel ratio flag F1 is set to 1 (rich) in step 230, and the process proceeds to step 232; on the other hand, if CDLY≦TDR, the process proceeds directly to step 232. Here, the maximum value TDR is defined by a positive value, and provides a rich determination delay time during which the air/fuel ratio is determined to be lean even if the output of the upstream O₂ sensor 75 changes from lean to rich.

In step 232, it is determined whether the value (0 or 1) of the air/fuel ratio flag F1 has changed or not, that is, whether the air/fuel ratio after the delay processing has changed state or not. If the air/fuel ratio has changed state, it is determined in step 234 whether the state change is from rich to lean or from lean to rich. If the state change is from rich to lean, then in step 240 the air/fuel ratio correction coefficient FAF is rapidly increased as follows.

$$FAF \leftarrow FAF+RSR$$

Conversely, if the state change is from lean to rich, then in step 242 the air/fuel ratio correction coefficient FAF is rapidly decreased as follows.

$$FAF \leftarrow FAF-RSL$$

That is, skip processing is performed.

If, in step 232, there is no change in the value of the air/fuel ratio flag F1, integral processing is performed in steps 236, 244, and 246. More specifically, it is determined in step 236 whether F1=0, and if F1=0 (lean), then in step 244

$$FAF \leftarrow FAF+KIR$$

On the other hand, if F1=1 (rich), then in step 246

$$FAF \leftarrow FAF-KIL$$

Here, the integral constants KIR and KIL are set sufficiently smaller than the skip constants RSR and RSL, that is, KIR<RSR and KIL<RSL. Therefore, in the lean state (F1=0), the amount of fuel injection is gradually increased in step 244; on the other hand, in the rich state (F1=1), the amount of fuel injection is gradually decreased in step 246.

In steps 248, 250, 252, and 254, guard processing is performed in which the air/fuel ratio correction coefficient FAF is made not smaller than a predetermined minimum value (for example, 0.8) but not larger than a predetermined maximum value (for example, 1.2). With this processing, if the calculated result of the air/fuel ratio correction coefficient FAF becomes excessively large or small for some reason, the engine air/fuel ratio is controlled by the guard value and prevented from becoming over-rich or over-lean.

Figure 7:
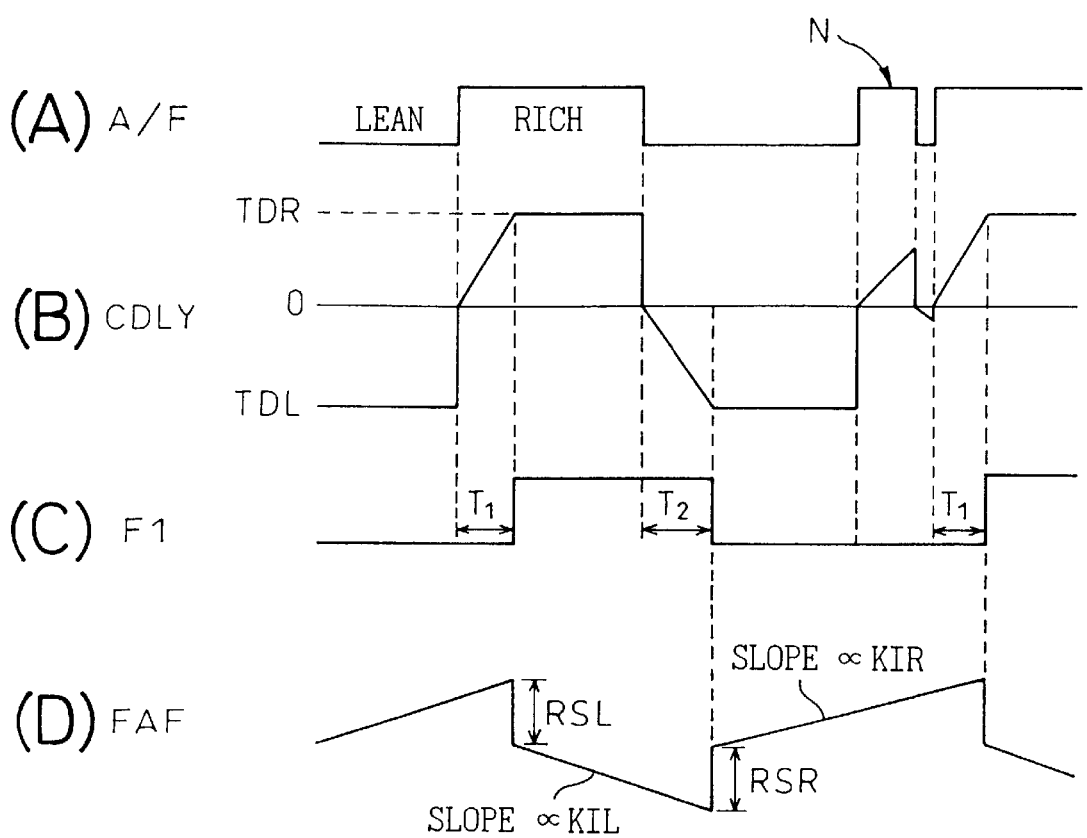
FIG. 7 is a time chart illustrating how a counter CDLY, a flag F1, and an air/fuel ratio correction coefficient FAF change with the air/fuel ratio (A/F) detected by an upstream $O_2$ sensor when the main air/fuel ratio feedback control is performed.

FIG. 7 illustrates how the counter CDLY (FIG. 7(B)), the flag F1 (FIG. 7(C)), and the air/fuel ratio correction coefficient FAF (FIG. 7(D)) change with the air/fuel ratio (A/F) (FIG. 7(A)) detected by the upstream O₂ sensor when the main air/fuel ratio feedback control of FIGS. 5 and 6 is performed. When the A/F changes from lean to rich, as shown in FIG. 7(A), the value of the air/fuel ratio flag F1 (FIG. 7(C)) does not instantly change from 0 to 1, but continues to be held at 0 during the time ($T_1$ in FIG. 7(C)) that the value of the counter CDLY increases from 0 to TDR, and at the end of $T_1$, the value of F1 changes from 0 to 1. Likewise, when the A/F changes from rich to lean, the value of F1 continues to be held at 1 during the time ($T_2$ in FIG. 7(C)) that the value of the counter CDLY decreases from 0 to TDL (TDL is a negative value), and at the end of $T_2$, the value of F1 changes from 1 to 0. With this control, if there occurs a brief, abrupt change in the output of the upstream $O_2$ sensor due to an external perturbation or other cause, as shown by N in FIG. 7(A), the value of the flag F1 does not change responding to the change in the output, and a stable air/fuel ratio control can thus be achieved.

As a result of the main air/fuel ratio feedback control, the value of the air/fuel ratio correction coefficient FAF increases and decreases in a periodic fashion as shown in FIG. 7(D), and the engine air/fuel ratio changes alternately between rich and lean. As explained with reference to FIG. 4, the fuel injection time TAU increases when the value of FAF increases, and decreases when the value of FAF decreases.

Next, the sub air/fuel ratio feedback control to be performed based on the output of the downstream $O_2$ sensor will be described. As previously described, the sub air/fuel ratio feedback control is performed in one of two ways: in one method, the various constants used when calculating the air/fuel ratio correction coefficient in the main air/fuel ratio feedback control are corrected based on the output of the downstream $O_2$ sensor, and in the other, a second air/fuel ratio correction coefficient based on the output of the downstream $O_2$ sensor is introduced. In the former method, the skip amounts RSR and RSL, the integral amounts KIR and KIL, the determination delay times TDR and TDL, the reference voltage VR1 for judging the upstream $O_2$ sensor output, etc. that are used when calculating the FAF as described above, are made variable.

For example, in the sub air/fuel ratio feedback control that uses variable skip amounts RSR and RSL for the air/fuel ratio correction coefficient FAF, the engine air/fuel ratio is caused to move toward the rich side or lean side by increasing or decreasing the values of RSR and RSL, based on the fact that, as can be seen from FIG. 7(D), as RSR increases and RSL decreases, the engine air/fuel ratio swings with a greater amplitude toward the rich side, causing the air/fuel ratio as a whole to move toward the rich side, and conversely, as RSR decreases and RSL increases, the engine air/fuel ratio swings with a greater amplitude toward the lean side, causing the air/fuel ratio as a whole to move toward the lean side. More specifically, when the air/fuel ratio detected by the downstream $O_2$ sensor continues to be lean or rich, RSR is increased or decreased at a predetermined rate. At this time, the lean skip value RSL for the air/fuel ratio correction coefficient FAF is varied so that the sum of the value of RSL and the value of RSR is maintained constant.

Figure 8:
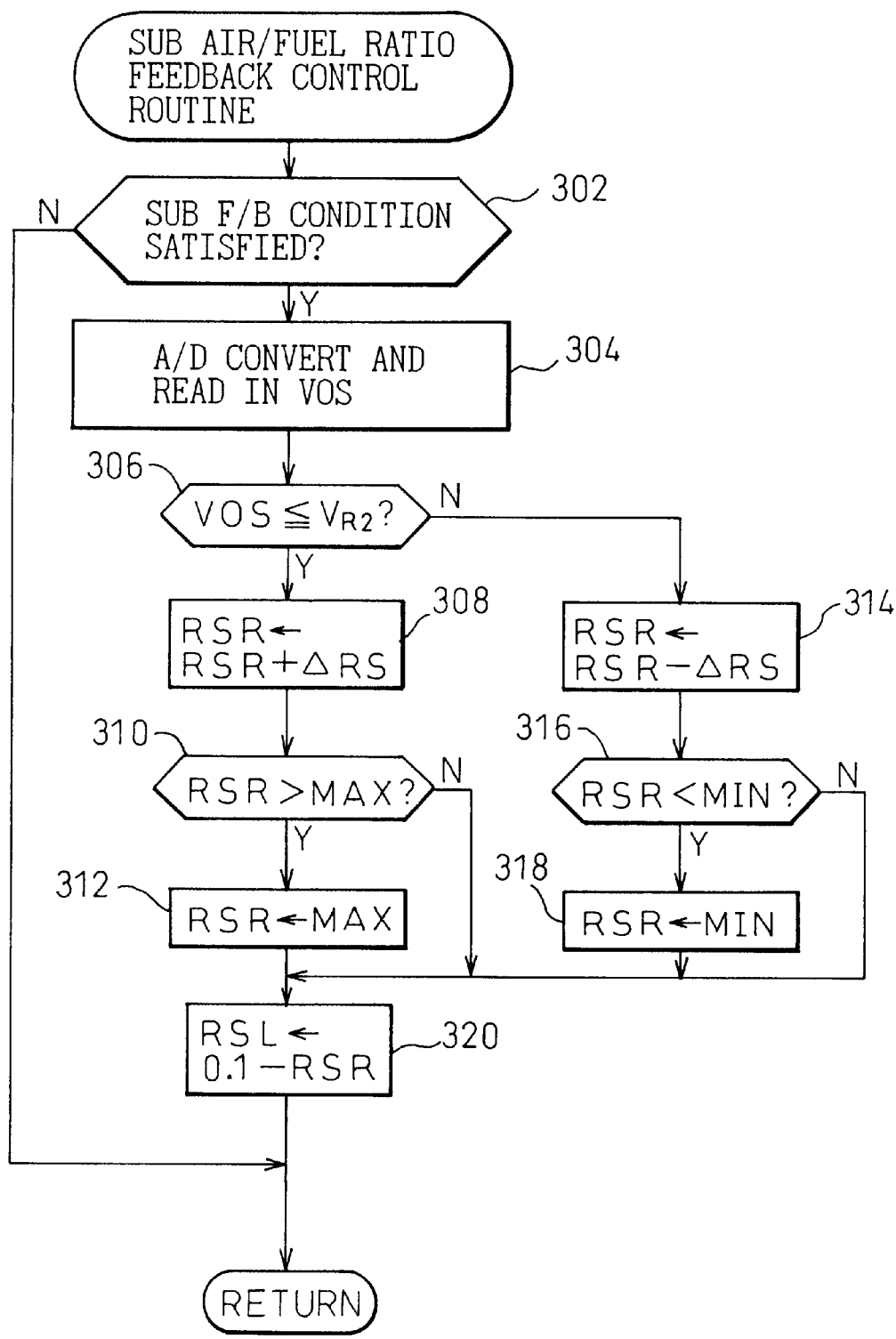
FIG. 8 is a flowchart illustrating the processing sequence for a sub air/fuel ratio feedback control routine executed by the CPU.

FIG. 8 is a flowchart illustrating the processing sequence for the sub air/fuel ratio feedback control routine in which RSR and RSL are made variable. This routine is executed by the CPU 91 at predetermined intervals of time (for example, every 512 ms) longer than the intervals at which the main air/fuel ratio feedback control is executed. In this routine, the output VOS of the downstream $O_2$ sensor 76 is compared with a reference voltage $V_{R2}$ (voltage equivalent to stoichiometric air/fuel ratio; for example, 0.45 volts), and when the air/fuel ratio in the exhaust downstream of the catalytic converter is richer than stoichiometry (VOS>$V_{R2}$), the correction amount RSR used in the main air/fuel ratio feedback control is decreased, and RSL is increased. On the other hand, when the air/fuel ratio in the exhaust downstream of the catalytic converter is leaner than stoichiometry (VOS≦$V_{R2}$), the correction amount RSR is increased, and RSL is decreased. As a result, even when the output of the upstream $O_2$ sensor 75 does not reflect the actual exhaust air/fuel ratio, for example, because the upstream $O_2$ sensor 75 has deteriorated or has been strongly influenced by the exhaust from a particular cylinder, the engine air/fuel ratio can be maintained precisely at stoichiometry, since the value of FAF is corrected based on the output of the downstream $O_2$ sensor 76.

First, as in the step 202 in FIG. 5, it is determined in step 302 whether the condition for initiating the feedback control is satisfied, and if the condition is not satisfied, the routine is terminated; on the other hand, if the condition is satisfied, the routine proceeds to step 304. In step 304, the output VOS of the downstream $O_2$ sensor 76 is A/D converted and read in. Next, in step 306, it is determined whether VOS shows a value equivalent to a lean air/fuel ratio (VOS≦$V_{R2}$); if VOS is shows a value equivalent to a lean air/fuel ratio, then the value of RSR is increased by a predetermined amount ΔRS in step 308, and the increased RSR is guarded by a predetermined maximum value MAX (for example, MAX=0.09) to prevent it from becoming larger than the maximum value (steps 310 and 312). On the other hand, if, in step 306, VOS shows a value equivalent to a rich air/fuel ratio (VOS>$V_{R2}$), then the value of RSR is decreased by the predetermined amount ΔRS in step 314, and the decreased RSR is guarded by a predetermined minimum value MIN (for example, MIN=0.01) to prevent it from becoming smaller than the minimum value (steps 316 and 318).

In the final step 320, using the thus calculated value of RSR, the value of RSL used in the main air/fuel ratio feedback control routine is calculated as RSL←0.1−RSR. That is, in this embodiment, the sum of RSR and RSL is always maintained at a constant value (0.1), RSL being decreased when RSR is increased and being increased when RSR is decreased.

In the above sub air/fuel ratio feedback control routine, when the exhaust air/fuel ratio detected by the downstream $O_2$ sensor 76 is rich, RSR is decreased while increasing RSL at the same time, and when the exhaust air/fuel ratio is lean, RSR is increased while decreasing RSL at the same time.

In the double $O_2$ sensor system described above, if a fault, such as a pinhole due to a crack or corrosion, occurs in the exhaust pipe between the $O_2$ sensor upstream of the catalyst and the $O_2$ sensor downstream of the catalyst, outside air may be drawn into the exhaust pipe by exhaust pulsation, causing the downstream $O_2$ sensor 76 to erroneously detect that the exhaust air/fuel ratio is lean. As a result, the engine air/fuel ratio is erroneously controlled toward the richer side, and the purification performance of the catalyst degrades, resulting in increased HC and CO emissions.

In view of this, in the embodiment of the present invention, provisions are made to stop the air/fuel ratio feedback control and perform control to continuously maintain the engine air/fuel ratio in a rich condition; in this condition, if the downstream $O_2$ sensor 76 does not produce an output that reflects the rich air/fuel ratio being effected by the enriching control, it is determined that outside air is being drawn into the exhaust pipe by exhaust pulsation due to a fault in the exhaust pipe between the $O_2$ sensor upstream of the catalyst and the $O_2$ sensor downstream of the catalyst.

Figure 9:
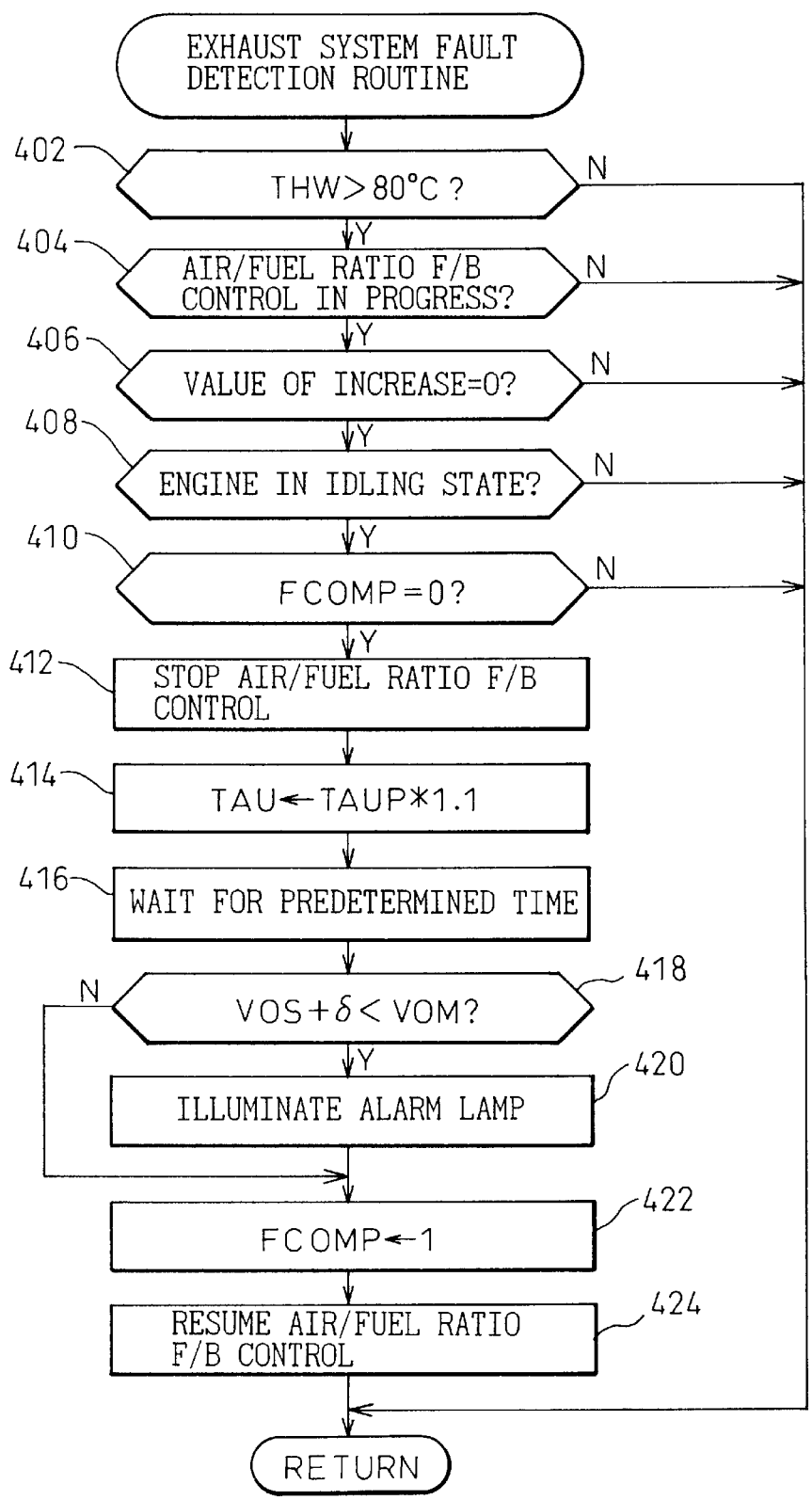
FIG. 9 is a flowchart illustrating the processing sequence for an exhaust system fault detection routine according to one embodiment of the present invention.

This will be described in further detail with reference to the flowchart of FIG. 9 which shows a processing sequence for the exhaust system fault detection routine executed by the CPU 91. This routine is executed at predetermined intervals of time. First, in step 402, to determine whether the engine has been warmed up, the coolant temperature data THW is checked to see whether the coolant temperature is higher than 80° C.; if the temperature is not higher than 80° C., the routine is terminated, but if the temperature is higher than 80° C., the routine proceeds to step 404. In step 404, it is determined whether the air/fuel ratio feedback control is being performed. If it is not being performed, the routine is terminated; otherwise, the routine proceeds to step 406.

In step 406, it is determined whether the value of increase due to fuel enrichment correction such as acceleration enrichment correction, output enrichment correction, etc. is 0 or not; if the value of increase is not 0, the routine is terminated, but if the value of increase is 0, the routine proceeds to step 408. In step 408, it is determined whether the engine is in an idling state, based on the throttle full-close signal from the idle switch 82 and the vehicle speed signal from the vehicle speed sensor 83; if the engine is not in an idling state, the routine is terminated, but if it is in an idling state, the routine proceeds to step 410. In this way, the present embodiment imposes the condition that the engine must be in an idling state in which the fluctuation in pressure is large and the effect of exhaust pipe leakage is most pronounced.

In step 410, it is determined whether the value of flag FCOMP that indicates the execution state of the exhaust system fault detection process is 0 or not; if FCOMP=1 meaning that the detection process has already been executed, the routine is terminated, but if FCOMP=0 meaning that the detection process has not yet been executed, the routine proceeds to step 412. Here, the flag FCOMP is reset to 0 when the ignition switch is turned on, and is set to 1 in step 422 as described later.

In step 412, the air/fuel ratio feedback control being performed based on the outputs of the upstream and downstream $O_2$ sensors 75 and 76 is stopped. Next, in step 414, the basic fuel injection time TAUP multiplied by 1.1 is taken as the fuel injection time TAU, thus forcefully performing control to enrich the mixture. In the next step 416, the process waits for a period of time corresponding to the time delay from the initiation of the enriching control to the time its result would normally be detected by the downstream $O_2$ sensor 76. Alternatively, provisions may be made to wait for a predetermined period of time after the upstream $O_2$ sensor 75 has detected the rich state.

Next, in step 418, it is determined whether or not the output VOS of the downstream $O_2$ sensor 76 plus a predetermined margin δ is smaller than the output VOM of the upstream $O_2$ sensor 75. If VOS+δ<VOM, that is, if the output of the downstream $O_2$ sensor 76 indicates a leaner state than the output of the upstream $O_2$ sensor 75, then it is determined that outside air is being drawn into the exhaust pipe between the upstream $O_2$ sensor 75 and the downstream $O_2$ sensor 76, and the process proceeds to step 420 to illuminate an alarm lamp 68 (see in FIG. 1).

On the other hand, if VOS+δ≧VOM, step 420 is not carried out. After that, in step 422, the flag FCOMP that indicates the execution state of the exhaust system fault detection process is set to 1. In the final step 424, the air/fuel ratio feedback control to be performed based on the outputs of the upstream and downstream $O_2$ sensors 75 and 76 is resumed, and the routine is terminated.

Figure 10:
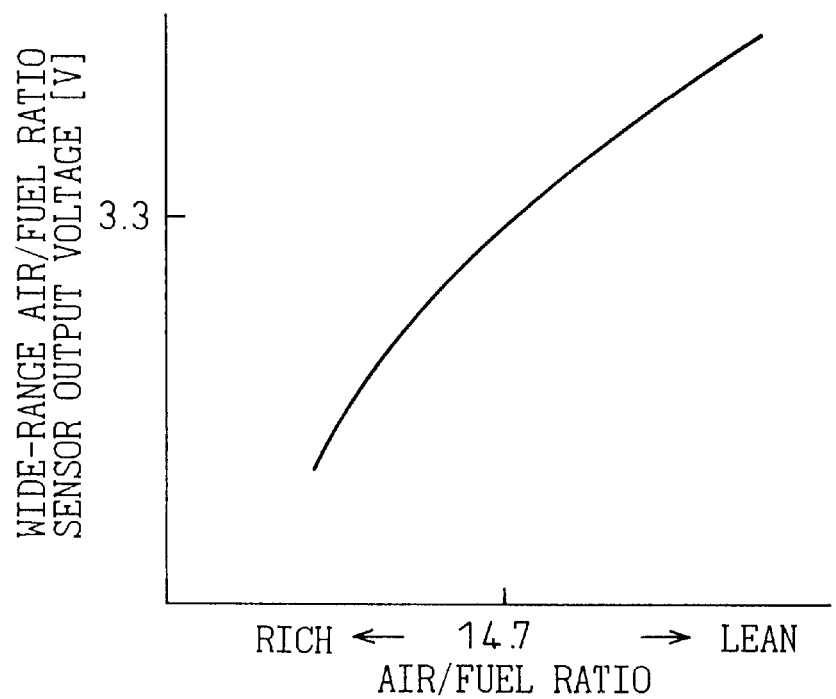
FIG. 10 is a characteristic diagram showing the output voltage of a wide-range air/fuel ratio sensor as a function of air/fuel ratio.

Next, a description will be given of the case (second embodiment) in which the present invention is applied to an $O_2$ storage amount constant control system. In this system, a wide-range air/fuel ratio sensor capable of linearly detecting air/fuel ratio is used, for example, in place of the upstream $O_2$ sensor 75 in FIG. 1. A typical output characteristic of the full-range air/fuel ratio sensor is shown in FIG. 10. Then, feedback control (F/B control) is performed based on proportional-integral operations (PI operations). That is, the amount of feedback fuel correction is calculated by the following equation.

Next fuel correction amount=$K_p$*(Present fuel error)+$K_I$* Σ(previous fuel errors)

where

Fuel error=(Actual fuel amount in cylinder)−(Target fuel amount in cylinder)

Actual fuel amount in cylinder=Amount of fuel actually burned in cylinder=Detected value of air amount/Detected value of air/fuel ratio Target fuel amount in cylinder=Amount of fuel in cylinder with cylinder intake air mixed therein to achieve target air/fuel ratio=Detected value of air amount/Target air/fuel ratio $K_p$=Proportional gain $K_I$=Integral gain As can be seen from the above equation for the fuel correction amount, the proportional term is the component that acts to maintain the air/fuel ratio at stoichiometry, while the integral term is the component that acts to eliminate steady errors (offset). That is, by the action of the integral term, the $O_2$ storage amount in the catalyst is maintained at a constant level. For example, when a lean gas occurs as a result of hard acceleration or the like, the air/fuel ratio is enriched by the action of the integral term, offsetting the effect of the lean gas. In such an $O_2$ storage amount constant control system, an $O_2$ sensor may be installed on the downstream side of the catalyst in order to compensate for variations in the output characteristic of the upstream wide-range air/fuel ratio sensor. In that case, the output voltage of the wide-range air/fuel ratio sensor is corrected in accordance with the amount of deviation of the output voltage of the $O_2$ sensor from the target value.

Figure 11:
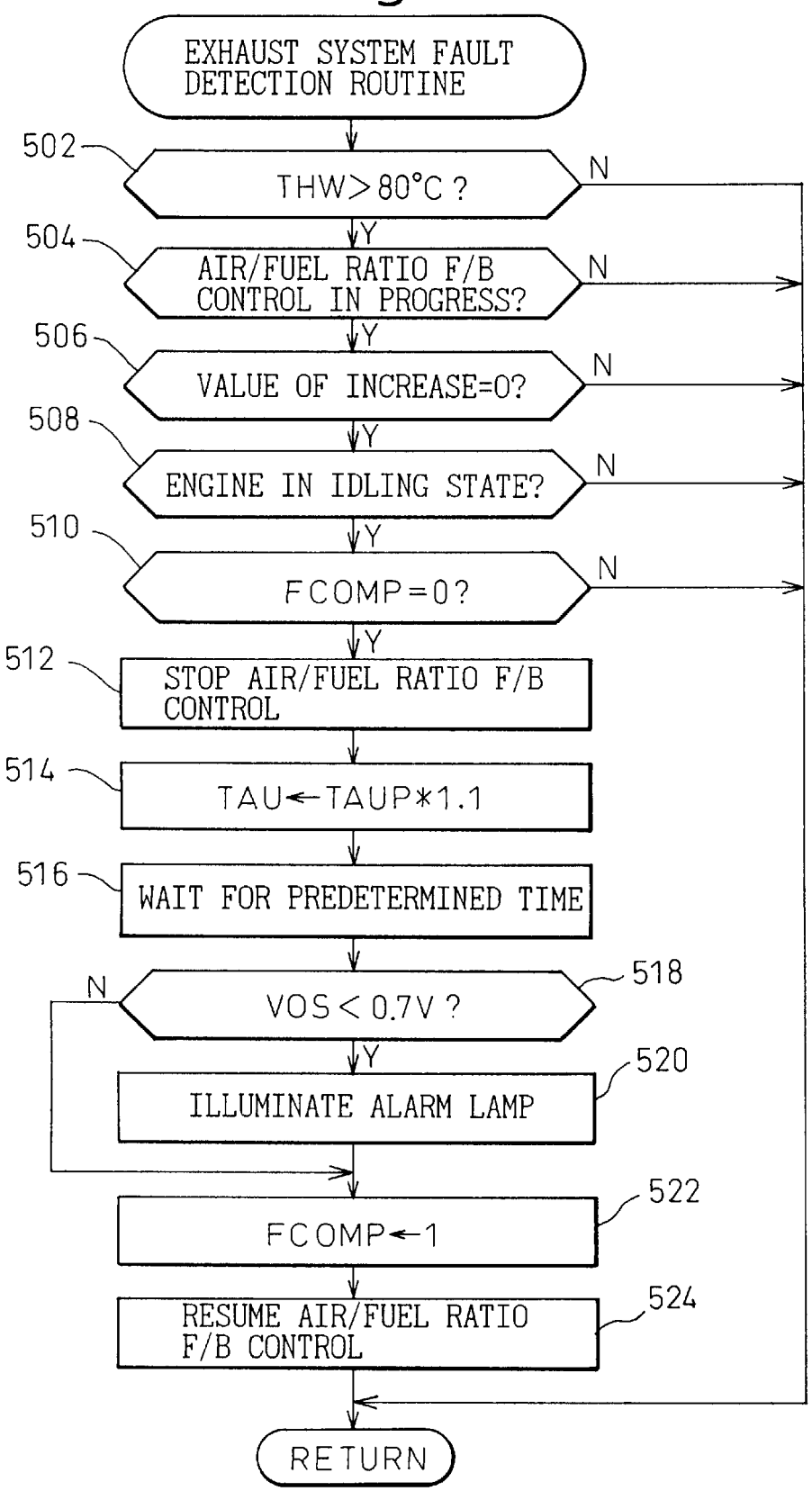
FIG. 11 is a flowchart illustrating the processing sequence for an exhaust system fault detection routine according to another embodiment of the present invention.

It is therefore preferable that provision be made for the detection of an exhaust system fault in the above $O_2$ storage amount constant control system. The exhaust system fault detection process for the above system is shown in the flowchart of FIG. 11. In FIG. 11, the process from steps 502 to 516 and 520 to 524 is the same as the process from steps 402 to 416 and 420 to 424 in FIG. 9, and processing in step 518 is performed in place of the processing in step 418 in FIG. 9. That is, as the output voltages of the two sensors cannot be directly compared as in step 418, step 518 checks the output VOS of the downstream $O_2$ sensor 76, and determines that outside air is being drawn into the exhaust pipe on the upstream side of the downstream $O_2$ sensor 76 if VOS is smaller than 0.7 V indicating the detection of a lean state when the enriching control is being performed.

Next, a description will be given of the case (third embodiment) in which the present invention is applied to an internal combustion engine equipped with a wide-range air/fuel ratio sensor as the only air/fuel ratio sensor in the exhaust system.

In this embodiment also, the air/fuel ratio feedback control is stopped with the engine in an idling state, and the amount of fuel injection is set so as to achieve the desired air/fuel ratio; in this condition, if the air/fuel ratio measured in the exhaust system is lean, it is determined that an exhaust system fault, that is, exhaust leakage, has occurred. Based on this determination, an alarm lamp is illuminated. In this case also, since exhaust leakage is detected by forcefully enriching the mixture, detection accuracy is enhanced compared with a system in which exhaust leakage is detected during the air/fuel ratio feedback control.

Here, the idling state is not an essential condition, but the detection accuracy can be further enhanced when the exhaust system fault (leakage) is diagnosed by forcefully enriching the mixture in an engine idling state in which exhaust pulsation is large.

Figure 12:
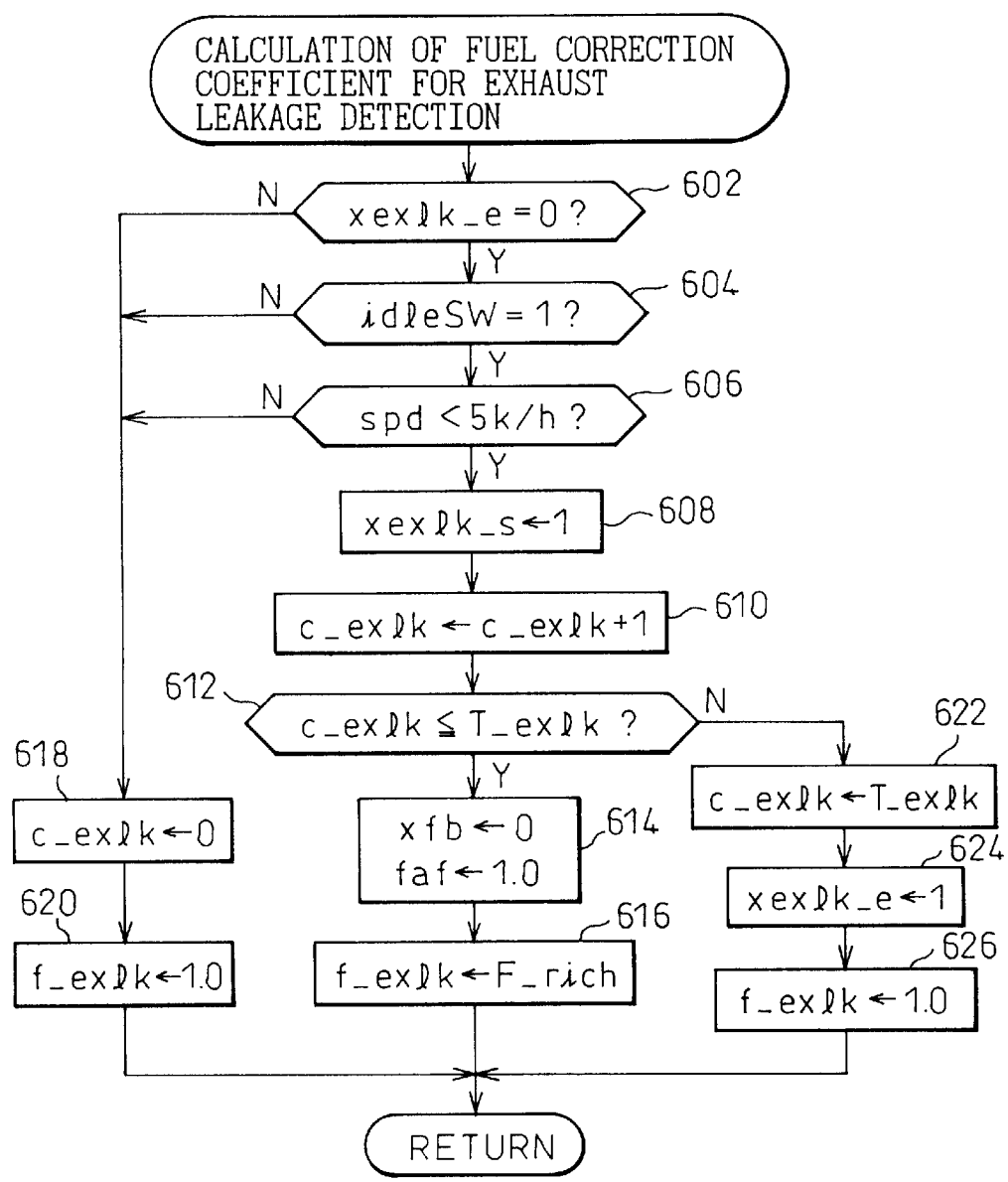
FIG. 12 is a flowchart illustrating the processing sequence for a fuel correction coefficient calculation routine for exhaust leakage detection according to a third embodiment.

FIG. 12 shows a routine for calculating a fuel correction coefficient for detection of exhaust leakage (exhaust system fault). This routine is executed, for example, at intervals of 60 ms. First, in step 602, an exhaust leakage detection completion flag xexlk_e is checked to see if the detection process is completed or not. If the detection process is not completed, that is, if xexlk_e=0, then step 604 checks whether the throttle value is fully closed, that is, whether a signal idleSW is 1 (ON). If the throttle valve is fully closed, step 606 checks vehicle speed spd to determine whether the vehicle is stationary or not.

If the answers to the decisions in steps 604 and 606 are both YES, it is determined that the engine is in an idling state, and in step 608, an exhaust leakage detection in-progress flag xexlk_s is set to 1 (to indicate that the detection process is currently in progress). Next, the routine proceeds to step 610 to increment an exhaust leakage detection counter c_exlk. Then, in step 612, it is determined whether the exhaust leakage detection counter c_exlk has reached a predetermined leakage determination time T_exlk. If it has not been reached yet, then in step 614 an air/fuel ratio feedback flag xfb is set to 0 to stop the air/fuel ratio feedback control, and an air/fuel ratio feedback correction coefficient faf is fixed to 1.0. Then, in step 616, a prescribed enrichment coefficient value F_rich is set as the exhaust leakage detection fuel correction coefficient f_exlk.

On the other hand, if the answer to the decision in step 602, 604, or 606 is NO, the routine proceeds to step 618 where the counter c_exlk is reset to 0, and in the next step 620, the exhaust leakage detection fuel correction coefficient f_exlk is set to 1.0.

If, in step 612, it is determined that c_exlk>T_exlk, the process proceeds to step 622 where T_exlk is substituted for c_exlk, and in the next step 624, the exhaust leakage detection completion flag xexlk_e is set to 1 (ON); further, in step 626, the exhaust leakage detection fuel correction coefficient f_exlk is set to 1.0.

Figure 13:
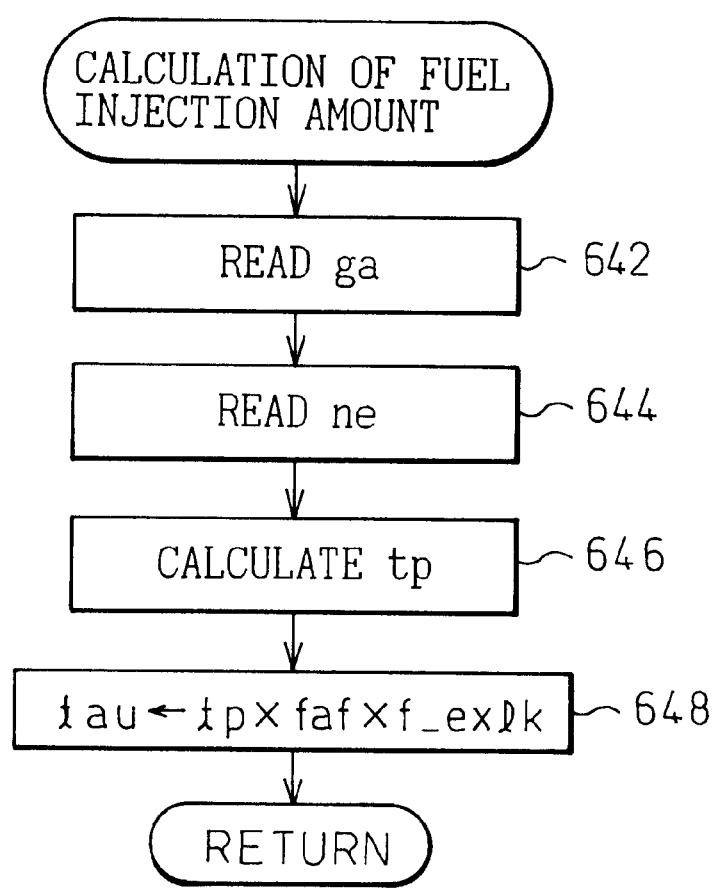
FIG. 13 is a flowchart illustrating the processing sequence for a fuel injection amount calculation routine according to the third embodiment.

FIG. 13 shows a fuel injection amount calculation routine. First, in step 642, intake air amount ga is read, and in the next step 644, engine speed ne is read. Then, in step 646, basic injection amount tp is calculated from the thus read intake air amount ga and engine speed ne. In the final step 648, final injection amount tau is calculated by multiplying the basic injection amount tp by the air/fuel ratio feedback correction coefficient faf and exhaust leakage detection fuel correction coefficient f_exlk.

Figure 14:
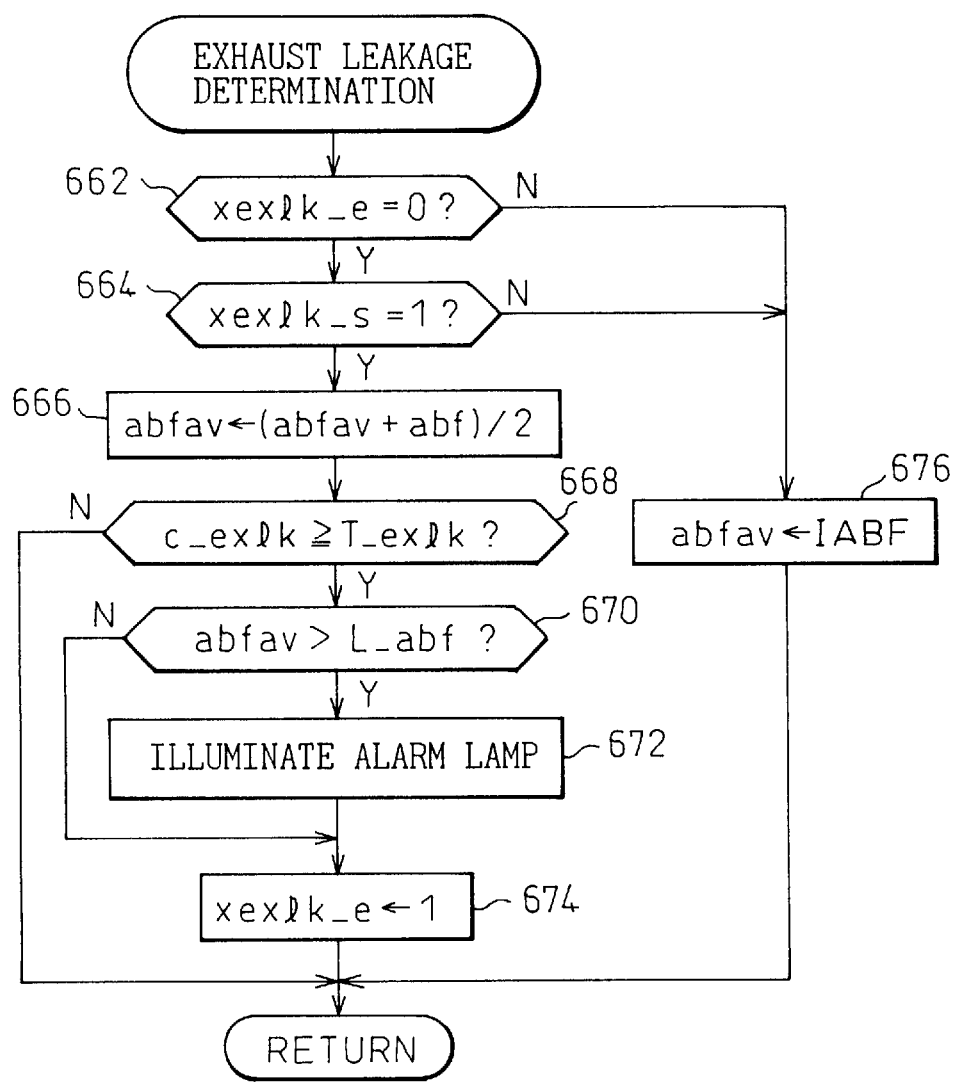
FIG. 14 is a flowchart illustrating the processing sequence for an exhaust leakage determination routine according to the third embodiment.

FIG. 14 shows an exhaust leakage determination routine. If it is determined in step 662 that xexlk_e=0, that is, the exhaust leakage detection process is not completed, the routine proceeds to step 664. If it is determined in step 664 that xexlk_s=1, that is, the exhaust leakage detection process is currently in progress, the routine proceeds to step 666 where an air/fuel ratio sensor output average value abfav is updated based on the current output abf of the air/fuel ratio sensor.

Next, in step 668, it is determined whether the counter c_exlk has reached T_exlk; if c_exlk≧T_exlk, the process proceeds to step 670 where the air/fuel ratio sensor output average value abfav is compared with a predetermined leakage detection air/fuel ratio L_abf. If it is determined that abfav>L_abf, that is, the average value is leaner than the leakage detection air/fuel ratio, the process proceeds to step 672 to illuminate the alarm lamp. Then, in step 674, the exhaust leakage detection completion flag xexlk_e is set to 1.

On the other hand, if it is determined in step 670 that the average value is rich, the routine proceeds directly to step 674 to terminate the exhaust leakage detection process. If xexlk_e≠0 in step 662, or if xexlk_s≠1 in step 664, then the routine proceeds to step 676 where the air/fuel ratio sensor output average value abfav is set to a predetermined air/fuel ratio initial value IABF. If the relation c_exlk≧Texlk does not hold in step 668, the process is immediately terminated.

Next, a description will be given of the case (fourth embodiment) in which the present invention is applied to an internal combustion engine equipped with two wide-range air/fuel ratio sensors as the air/fuel ratio sensors in the exhaust system. In this embodiment, a leakage point is identified based on the results of the measurements made by the respective air/fuel ratio sensors. In this embodiment also, the fuel correction coefficient calculation routine for exhaust leakage detection shown in FIG. 12 and the fuel injection amount calculation routine shown in FIG. 13 are executed.

Figure 15:
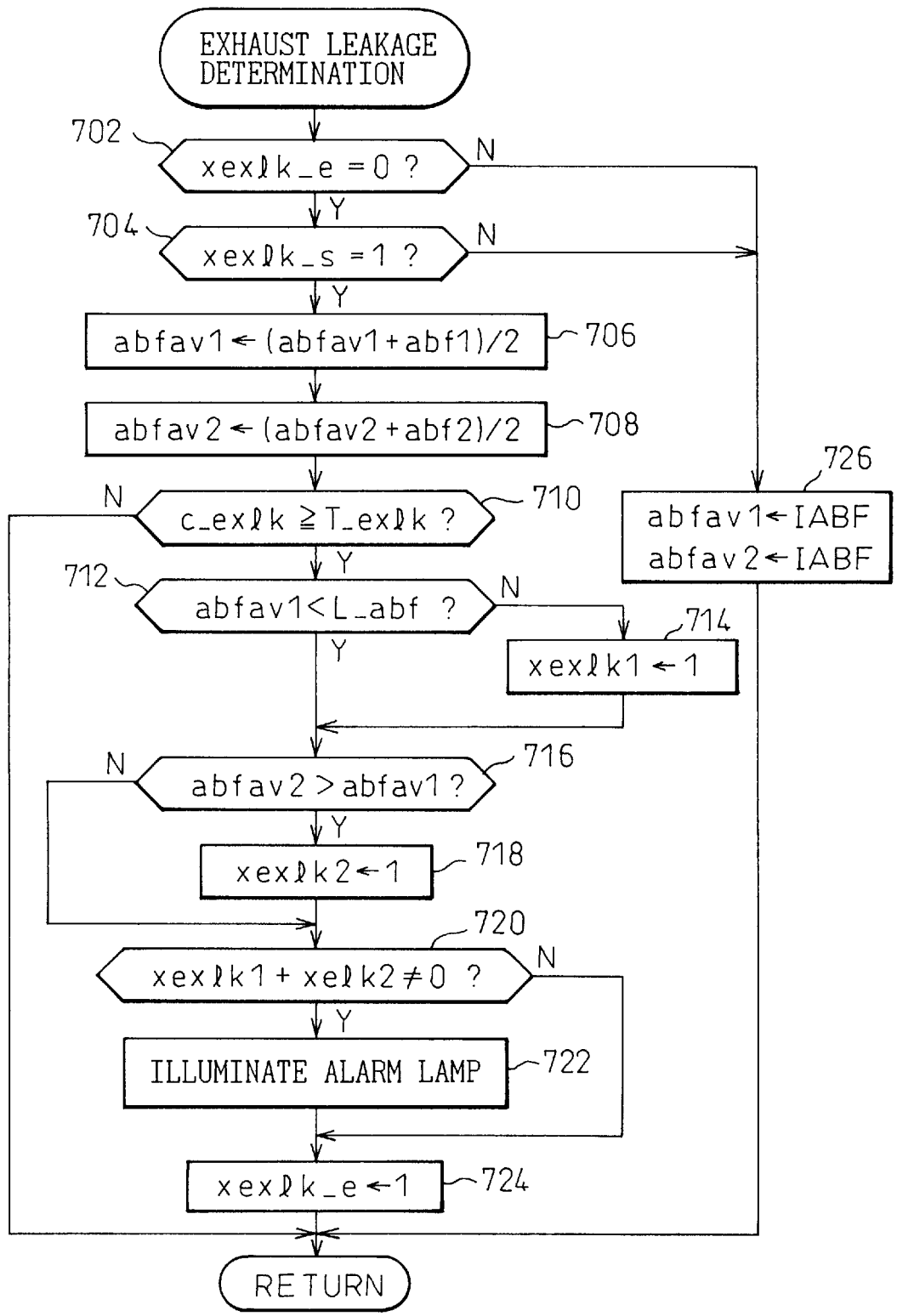
FIG. 15 is a flowchart illustrating the processing sequence for an exhaust leakage determination routine according to a fourth embodiment.

The exhaust leakage determination routine executed in this embodiment is shown in FIG. 15. If it is determined in step 702 that xexlk_e=0, that is, the leakage detection process is not completed, and in the next step 704 that xexlk_s=1, that is, the exhaust leakage detection process is currently in progress, then in step 706 a first sensor output average value abfav1 is updated based on the current output abf1 of the upstream air/fuel ratio sensor (first sensor), and in step 708, a second sensor output average value abfav2 is updated based on the current output abf2 of the downstream air/fuel ratio sensor (second sensor).

By repeatedly executing this routine, the above average values are repeatedly updated until the relation c_exlk≧T_exlk holds in step 710. When this relation holds, if abfav1<L_abf in the next step 712, it is determined that there is no leakage on the upstream side of the first sensor. If abfav1≧L_abf, it is determined that there is a leakage, and a first leakage detection flag xexlk1 is set to 1 (ON) in step 714.

Next, in step 716, the air/fuel ratio obtained from the second sensor is compared with the air/fuel ratio obtained from the first sensor. If it is determined that abfav2>abfav1, a second leakage detection flag xexlk2 is set to 1 (ON) in step 718 by determining that there is a leakage in the passage between the first sensor and the second sensor. Then, if, in step 720, either flag, xexlk1 or xexlk2, is 1, an alarm lamp is illuminated in step 722. Next, in step 724, the detection process completion flag xexlk_e is set to 1 (ON). If xexlk_e≠0 in step 702 or if xexlk_s≠1 in step 704, then the routine proceeds to 726 where the air/fuel ratio sensor output average values abfav1 and abfav2 are set to a predetermined air/fuel ratio initial value IABF.

Next, a description will be given of the case (fifth embodiment) in which the present invention is applied to an internal combustion engine of a vehicle equipped with an engine idling stop means from the viewpoint of energy conservation. As earlier noted, it is preferable to detect an exhaust system fault (leakage) when the engine is in an idling state in which exhaust pulsation is large, but in a vehicle equipped with such an idling stop function, there is no idling region in the first place. In this embodiment, therefore, when a condition for exhaust leakage detection occurs in the engine, the engine is operated in an idling state so that leakage detection can be performed.

Figure 16:
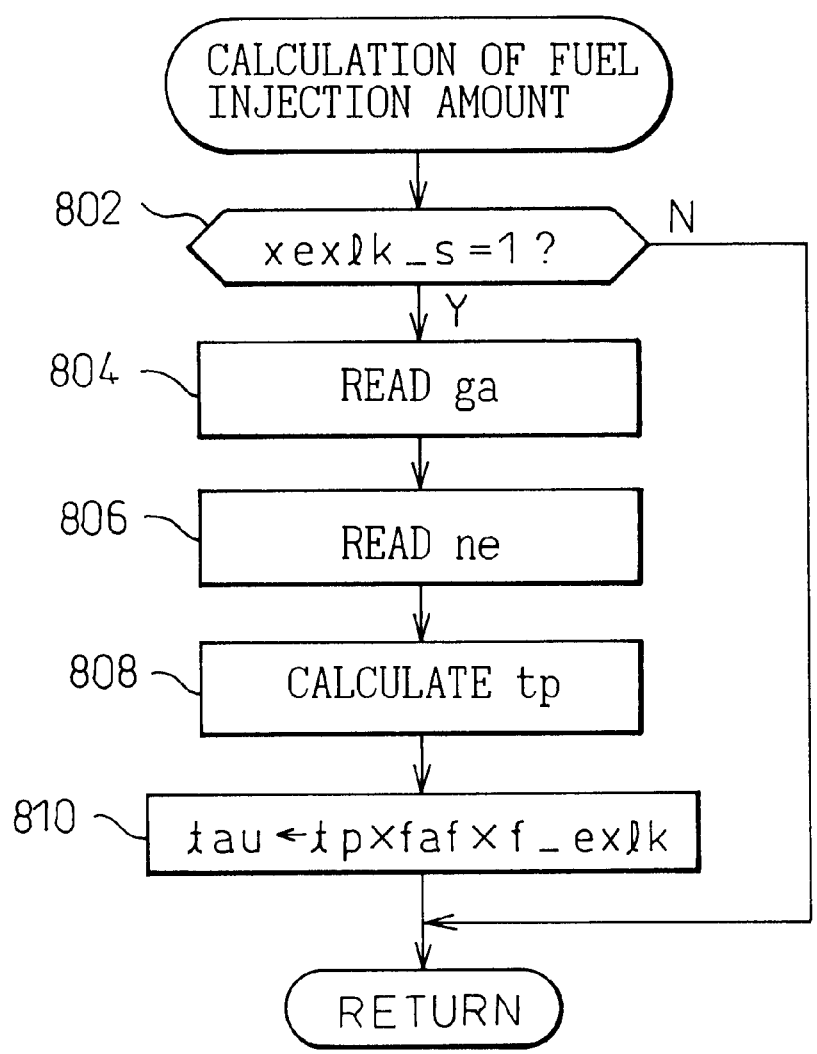
FIG. 16 is a flowchart illustrating the processing sequence for a fuel injection amount calculation routine according to a fifth embodiment.

In this embodiment, the fuel correction coefficient calculation routine for exhaust leakage detection shown in FIG. 12 and the exhaust leakage determination routine shown in FIG. 14 are executed. The fuel injection amount calculation routine executed in this embodiment is shown in FIG. 16.

First, in step 802, it is determined whether the exhaust leakage detection in-progress flag xexlk_s is 1 or not. When xexlk_s=1, that is, when the exhaust leakage detection process is currently in progress, steps 804, 806, 808, and 810, the processing operations of which are the same as those in the earlier described steps 642, 644, 646, and 648 in FIG. 13, are carried out to calculate the fuel injection amount tau. On the other hand, if xexlk_s=0 in step 802, that is, when the exhaust leakage detection process is currently not in progress, the fuel injection for engine idling is not performed.

Next, a description will be given of the case (sixth embodiment) in which the present invention is applied to an internal combustion engine of a hybrid vehicle which uses the internal combustion engine in combination with an electric motor for vehicle driving. When detecting the presence or absence of an exhaust system fault in such a hybrid vehicle, the operating ratio between the internal combustion engine and the electric motor is changed so that the internal combustion engine operates within a designated operating range, and the engine is operated with a rich air/fuel ratio. At this time, if the air/fuel ratio measured in the exhaust system is lean or the oxygen concentration is high, it is determined that exhaust leakage has occurred. Here, the detection accuracy can be enhanced by setting the operating condition so that the engine is operated within an operating range where engine load is low and exhaust pulsation is large.

In this embodiment, the fuel correction coefficient calculation routine for exhaust leakage detection (FIG. 17) and fuel injection amount calculation routine (FIG. 18) described hereinafter are performed in addition to the exhaust leakage determination routine previously described with reference to FIG. 14.

Figure 17:
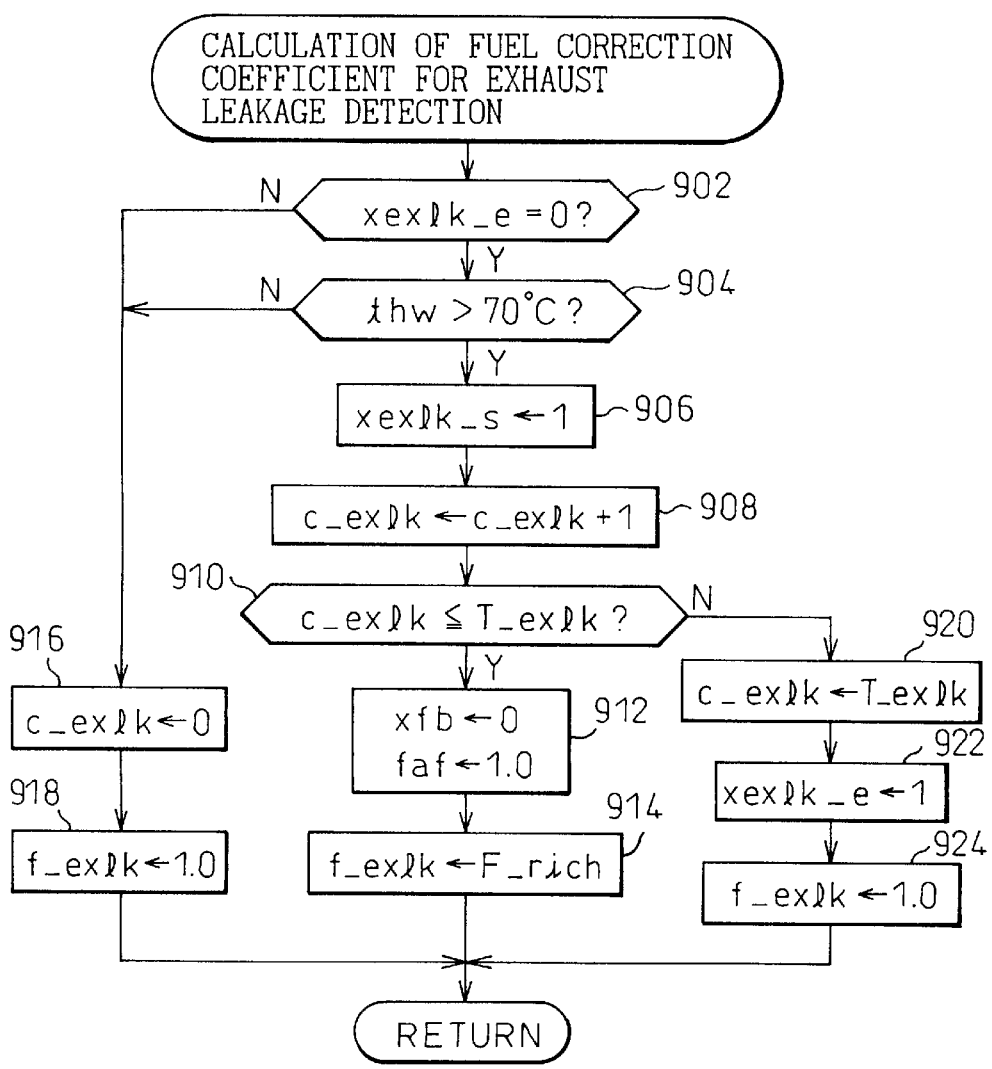
FIG. 17 is a flowchart illustrating the processing sequence for a fuel correction coefficient calculation routine for exhaust leakage detection according to a sixth embodiment.

In the fuel correction coefficient calculation routine for exhaust leakage detection in FIG. 17, first, the exhaust leakage detection completion flag xexlk_e is examined in step 902 to determine whether the detection process is completed or not. If the detection process is not completed, that is, if xexlk_e=0, the routine proceeds to step 904 where the engine coolant temperature thw is checked to determined whether engine warm-up is completed or not and, if engine warm-up is completed, the routine proceeds to step 906. The process after step 906 is the same as the process after step 608 in FIG. 12, and therefore, will not be described here.

Figure 18:
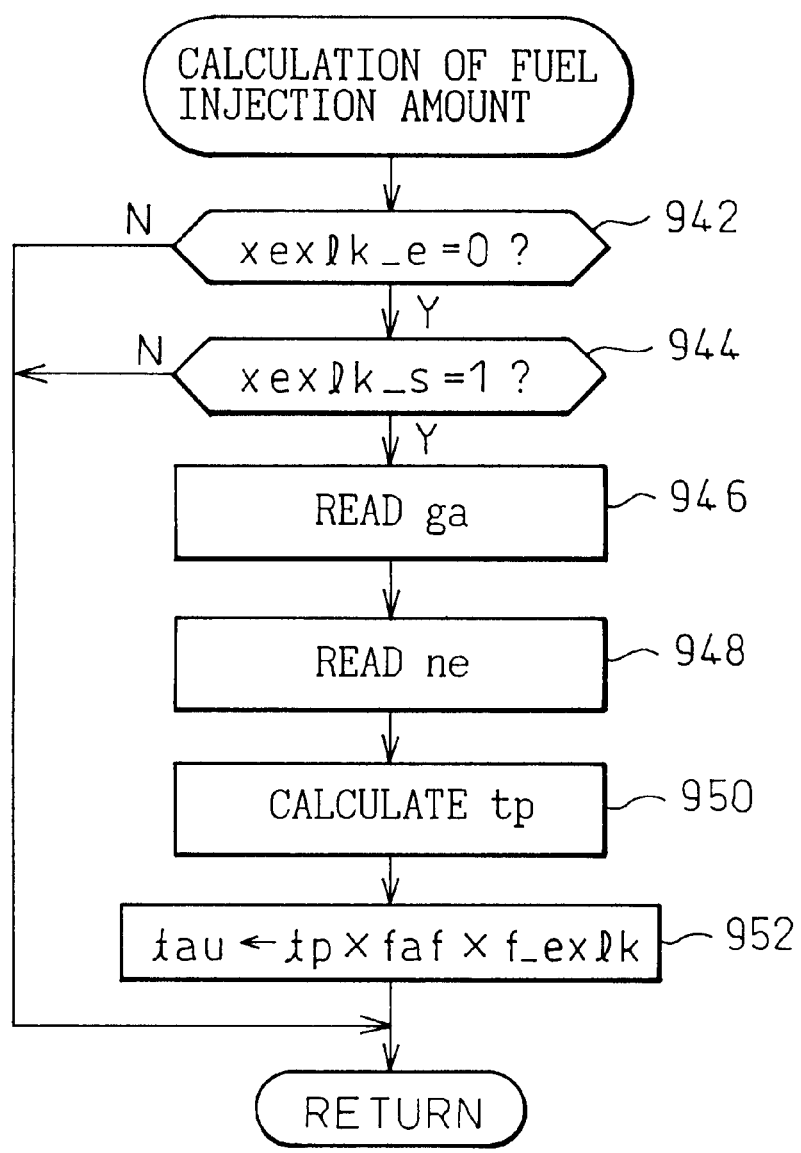
FIG. 18 is a flowchart illustrating the processing sequence for a fuel injection amount calculation routine according to the sixth embodiment.

In the fuel injection amount calculation routine of FIG. 18, first, it is checked in step 942 whether the relation xexlk_e=0 holds, that is, whether the exhaust leakage detection process is not completed yet. If the exhaust leakage detection process is not completed yet, the routine proceeds to step 944 to determine whether the exhaust leakage detection in-progress flag xexlk_s is 1 or not. If xexlk_s 1, that is, if the exhaust leakage detection process is currently in progress, steps 946, 948, 950, and 952, the processing operations of which are the same as those in the earlier described steps 642, 644, 646, and 648 in FIG. 13, are carried out to calculate the fuel injection amount tau. On the other hand, when the exhaust leakage detection process is completed, or when the exhaust leakage detection process is currently not in progress, the fuel injection for exhaust leakage detection is not performed.

Figure 19:
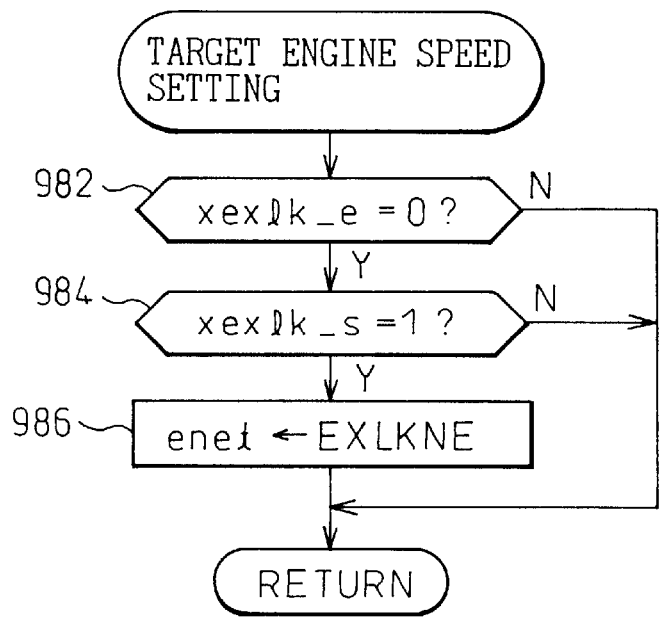
FIG. 19 is a flowchart illustrating the processing sequence for an engine speed setting routine according to the sixth embodiment.

Further, in this embodiment, target engine speed is set in the routine shown in FIG. 19 so that the negative pressure wave in the exhaust pipe becomes large. In this routine, first, the exhaust leakage detection completion flag xexlk_e is examined in step 982 to determine whether the detection process is completed or not. If the detection process is not completed, that is, if xexlk_e=0, the routine proceeds to step 984 where it is determined whether the exhaust leakage detection in-progress flag xexlk_s is 1 or not. If xexlk_s=1, that is, if the exhaust leakage detection process is currently in progress, then in step 986 the target engine speed enet is set to a specified low engine speed EXLKNE at which the negative pressure wave in the exhaust pipe becomes large.

Finally, a description will be given of the case (seventh embodiment) in which the present invention is applied to an internal combustion engine equipped with a variable valve timing (VVT) mechanism. The VVT mechanism varies, for example, the open/close timings of intake valves. By controlling the VVT mechanism so that the negative wave pressure in the exhaust passage becomes large, the accuracy of exhaust system fault (leakage) detection can be increased; generally, when control is performed in such a direction as to increase the period (overlap period) during which the intake and exhaust valves are open at the same time, the negative wave pressure in the exhaust passage becomes large.

Figure 20:
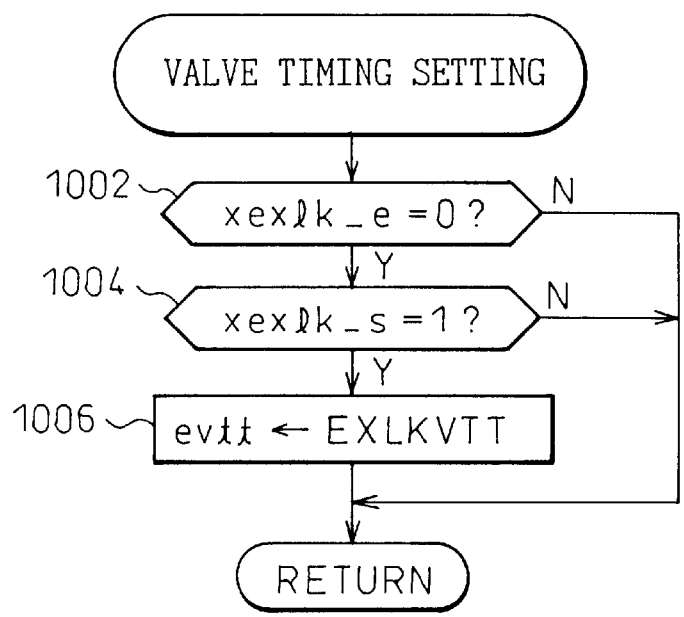
FIG. 20 is a flowchart illustrating the processing sequence for a valve timing setting routine according to a seventh embodiment.

In this embodiment, the valve timing setting routine (FIG. 20) described below is executed in addition to the fuel correction coefficient calculation routine for exhaust leakage detection shown in FIG. 12, the fuel injection amount calculation routine shown in FIG. 13, and the exhaust leakage determination routine shown in FIG. 14.

In the valve timing setting routine, first it is determined in step 1002 whether the relation xexlk_e=0 holds, that is, whether the exhaust leakage detection process is not completed yet. If the exhaust leakage detection process is not completed yet, the routine proceeds to step 1004 to determine whether the exhaust leakage detection in-progress flag xexlk_s is 1 or not. If xexlk_s=1, that is, if the exhaust leakage detection process is currently in progress, then in step 1006 the target valve timing evtt is set to a specified EXLKVTT at which the negative pressure wave in the exhaust pipe becomes large.

As described above, according to the present invention, an exhaust system fault (leakage) can be detected reliably and quickly based on the output(s) of the air/fuel ratio sensor(s) installed in the exhaust system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for detecting an exhaust leak in an exhaust system of an internal combustion engine in which air/fuel ratio is feedback-controlled based on outputs of an upstream and a downstream air/fuel ratio sensor respectively mounted on the upstream and downstream sides of a catalytic converter installed in the exhaust system, comprising:

enriching control means for stopping the feedback control and performing control to continuously maintain the air/fuel ratio of the engine in a rich condition; and exhaust leak determining means for determining that there is an exhaust leak in the exhaust system when the downstream air/fuel ratio sensor does not produce an output that corresponds to the rich air/fuel ratio being provided under control of the enriching control means.

2. An apparatus as claimed in claim 1, wherein both the upstream air/fuel ratio sensor and the downstream air/fuel ratio sensor are $O_2$ sensors for detecting whether the air/fuel ratio in exhaust gas is rich or lean, and the fault determining means determines the presence or absence of a fault in the exhaust system by comparing the outputs of the two sensors.

3. An apparatus as claimed in claim 1, wherein the enriching control means performs the enriching control when the engine is in an idling state.

4. An apparatus as claimed in claim 3, wherein the internal combustion engine is equipped with a variable valve timing mechanism, and wherein when detecting the presence or absence of a fault in the exhaust system, the variable valve timing mechanism is controlled so that a negative pressure wave in the exhaust system becomes large.

5. An apparatus as claimed in claim 1, wherein the upstream air/fuel ratio sensor is a wide-range air/fuel ratio sensor whose output characteristic is substantially proportional to the air/fuel ratio in exhaust gas, while the downstream air/fuel ratio sensor is an $O_2$ sensor for detecting whether the air/fuel ratio in the exhaust gas is rich or lean, and wherein the fault determining means determines that there is a fault in the exhaust system when the output of the downstream $O_2$ sensor shows a value corresponding to a lean condition.

6. An apparatus as claimed in claim 5, wherein the internal combustion engine is equipped with a variable valve timing mechanism, and wherein when detecting the presence or absence of a fault in the exhaust system, the variable valve timing mechanism is controlled so that a negative pressure wave in the exhaust system becomes large.

7. An apparatus for detecting a fault in an exhaust system of an internal combustion engine, comprising:

control mean for providing a rich air/fuel ratio forcefully and continuously when detecting the presence or absence of a fault in the exhaust system; and determining means for determining that there is a fault in the exhaust system when a sensor mounted in the exhaust system does not produce an output that corresponds to the rich air/fuel ratio being provided under control of the control means, wherein the internal combustion engine is equipped with a variable valve timing mechanism, and wherein when detecting the presence or absence of a fault in the exhaust system, the variable valve timing mechanism is controlled so that a negative pressure wave in the exhaust system becomes large.

8. An apparatus for detecting a fault in an exhaust system of an internal combustion engine in which air/fuel ratio is feedback-controlled based on outputs of an upstream and or downstream air/fuel ratio sensor respectively mounted on the upstream and downstream sides of a catalytic converter installed in the exhaust system, comprising:

enriching control means for stopping the feedback control and performing control to continuously maintain the air/fuel ratio of the engine in a rich condition; and fault determining means for determining that there is a fault in the exhaust system when the downstream air/fuel ratio sensor does not produce an output that corresponds to the rich air/fuel ratio being provided under control of the enriching control means, wherein the internal combustion engine is equipped with a variable valve timing mechanism, and wherein when detecting the presence or absence of a fault in the exhaust system, the variable valve timing mechanism is controlled so that a negative pressure wave in the exhaust system becomes large.

9. An apparatus for detecting a fault in an exhaust system of an internal combustion engine in which air/fuel ratio is feedback-controlled based on outputs of an upstream and a downstream air/fuel ratio sensor respectively mounted on the upstream and downstream sides of a catalytic converter installed in the exhaust system, comprising:

enriching control means for stopping the feedback control and performing control to continuously maintain the air/fuel ratio of the engine in a rich condition; and fault determining means for determining that there is a fault in the exhaust system when the downstream air/fuel ratio sensor does not produce an output that corresponds to the rich air/fuel ratio being provided under control of the enriching control means, wherein both the upstream air/fuel ratio sensor and the downstream air/fuel ratio sensor are $O_2$ sensors for detecting whether the air/fuel ratio in exhaust gas is rich or lean, and the fault determining means determines the presence or absence of a fault in the exhaust system by comparing the outputs of the two sensors, wherein the internal combustion engine is equipped with a variable valve timing mechanism, and wherein when detecting the presence or absence of a fault in the exhaust system, the variable valve timing mechanism is controlled so that a negative pressure wave in the exhaust system becomes large.

* * * * *